US012401050B2

(12) United States Patent
Maruyama et al.

(10) Patent No.: US 12,401,050 B2
(45) Date of Patent: *Aug. 26, 2025

(54) FUEL CELL SHIP

(71) Applicant: Yanmar Holdings Co., Ltd., Osaka (JP)

(72) Inventors: Takehiro Maruyama, Osaka (JP); Yasuyoshi Yamaguchi, Osaka (JP); Takuya Hiraiwa, Osaka (JP); Manabu Shinagawa, Osaka (JP); Yukihiko Kimura, Kunisaki (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 620 days.

This patent is subject to a terminal disclaimer.

(21) Appl. No.: 17/830,112

(22) Filed: Jun. 1, 2022

(65) Prior Publication Data
US 2022/0393198 A1  Dec. 8, 2022

(30) Foreign Application Priority Data
Jun. 2, 2021   (JP) .................................. 2021-092708

(51) Int. Cl.
*H01M 8/04858*   (2016.01)
*B63H 21/00*     (2006.01)
(Continued)

(52) U.S. Cl.
CPC .......... *H01M 8/0494* (2013.01); *B63H 21/17* (2013.01); *B63H 21/38* (2013.01);
(Continued)

(58) Field of Classification Search
CPC .. B63H 21/00; B63H 21/17; B63H 2021/003; B63H 21/38; B63B 21/21; B63B 11/04;
(Continued)

(56) References Cited

U.S. PATENT DOCUMENTS

| 8,123,577 B2 * | 2/2012 | Riggs .................... H01M 12/06 |
| | | 440/6 |
| 8,683,937 B2 * | 4/2014 | Sancoff .................... B63G 8/36 |
| | | 114/61.15 |

(Continued)

FOREIGN PATENT DOCUMENTS

| CN | 110335438 B   | 1/2021 |
| JP | 2018-092815 A | 6/2018 |
| KR | 1020160058012 A | 5/2016 |

OTHER PUBLICATIONS

European Search Report dated May 31, 2023 issued for EP Application No. 22175802.2.

*Primary Examiner* — Daniel V Venne
(74) *Attorney, Agent, or Firm* — NORTON ROSE FULBRIGHT US LLP

(57) ABSTRACT

A fuel cell ship includes a fuel cell compartment in which a fuel cell is installed, a tank compartment in which a fuel tank is installed, a fuel supply pipe through which fuel is supplied from the fuel tank to the fuel cell, and a control unit. The fuel supply pipe includes at least two shutoff valves. Fuel gas detectors that detect a fuel gas being in a gaseous state of the fuel are each installed in the compartments. If at least one of the fuel gas detectors detects that a concentration of the fuel gas is equal to or greater than a predetermined standard value, the control unit controls to close a shutoff valve in a compartment out of the tank compartment and the fuel cell compartment, where the fuel gas detector having detected the concentration equal to or greater than the standard value is installed.

8 Claims, 9 Drawing Sheets

(51) Int. Cl.
  *B63H 21/17* (2006.01)
  *B63H 21/38* (2006.01)
  *H01M 8/04082* (2016.01)

(52) U.S. Cl.
  CPC ... *H01M 8/04201* (2013.01); *B63H 2021/003* (2013.01); *H01M 2250/20* (2013.01)

(58) Field of Classification Search
  CPC .............. B63B 11/02; H01M 8/04947; H01M 8/04679; H01M 8/04753; H01M 8/04865; H01M 2250/20; H01M 8/249; H01M 8/0444; H01M 16/006; H01M 8/04932; H01M 8/04089; H01M 8/04201; H01M 8/04664; H01M 8/04955; H01M 50/35; H01M 2220/20; H01M 8/2475; H01M 8/04447; H01M 8/0494; H01M 8/04388; F17C 2201/0109; F17C 2201/035; F17C 2201/056; F17C 2205/0103; F17C 2205/0142; F17C 2205/0176; F17C 2205/0335; F17C 2221/012; F17C 2223/0123; F17C 2223/036; F17C 2250/0452; F17C 2260/038; F17C 2260/042; F17C 2270/0105; F17C 1/002; F17C 13/084; B60L 58/13; B60L 2240/54; B60L 50/71; B60L 2200/32; B60L 3/0053; B60L 50/70; B60L 58/30; B60R 25/042; Y02E 60/50; Y02T 90/40; Y02T 70/50
  USPC ..................................... 440/60, 1; 180/65.22
  See application file for complete search history.

(56) References Cited

U.S. PATENT DOCUMENTS

| | | | |
|---|---|---|---|
| 10,071,650 | B2 | 9/2018 | Saito |
| 10,364,009 | B2 * | 7/2019 | Sako ................. H01M 8/04089 |
| 2006/0009092 | A1 * | 1/2006 | Krietzman ............ B63H 21/17 |
| | | | 440/6 |
| 2006/0012248 | A1 * | 1/2006 | Matsushita ............. B60L 58/40 |
| | | | 307/10.1 |
| 2007/0122667 | A1 * | 5/2007 | Kelley .................... C01B 3/382 |
| | | | 429/513 |
| 2015/0280260 | A1 * | 10/2015 | Lee .................. H01M 8/04231 |
| | | | 429/414 |

* cited by examiner

FUEL CELL SHIP

CROSS-REFERENCE TO RELATED APPLICATIONS

This application is claims priority under 35 U.S.C. § 119 to JP Application No. 2021-092708 filed Jun. 2, 2021, the entire contents of which are hereby incorporated by reference.

TECHNICAL FIELD

The present invention relates to a fuel cell ship.

BACKGROUND ART

In the related art, a fuel cell ship in which a fuel gas (for example, hydrogen gas) is supplied from a fuel tank to a fuel cell and a propulsion device is driven by electric power generated by the fuel cell has been proposed (see, for example, Patent Document 1).

PRIOR ART DOCUMENT

Patent Document

Patent Document 1: Japanese Unexamined Patent Application Publication No. 2018-92815

SUMMARY OF INVENTION

Technical Problem

The fuel gas is a combustible gas. For this reason, in a fuel cell ship, it may be required to install a fuel tank that stores the fuel gas and a fuel cell supplied with the fuel gas, in independent compartments. A compartment where the fuel tank is installed is also referred to as a "tank compartment" hereinafter. A compartment where the fuel cell is installed is also referred to as a "fuel cell compartment" hereinafter. In an unlikely event of a fuel gas leak in at least one of the tank compartment and the fuel cell compartment, it would be a hazardous state, and thus would be necessary to take some measures.

The present invention has been made to solve the above problems, and an object of the present invention is to provide a fuel cell ship where electric power generation by a fuel cell can be stopped in an unlikely event of a fuel gas leak in at least one of a tank compartment and a fuel cell compartment.

Solution to Problem

A fuel cell ship according to an aspect of the present invention includes a fuel cell that generates electric power by an electrochemical reaction of fuel, a propulsion device that generates a propulsive force in a hull by the electric power supplied from the fuel cell, a fuel cell compartment in which the fuel cell is installed, a tank compartment in which a fuel tank that stores the fuel is installed, and a fuel supply pipe through which the fuel is supplied from the fuel tank to the fuel cell. In the fuel cell ship, the fuel supply pipe includes two or more shutoff valves, and at least one of the two or more shutoff valves is installed in each of the tank compartment and the fuel cell compartment, the fuel cell ship further includes a control unit that controls opening and closing the shutoff valves, the tank compartment and the fuel cell compartment are each provided with fuel gas detectors that detect a fuel gas being in a gaseous state of the fuel, and if at least one of the fuel gas detectors detects that a concentration of the fuel gas is equal to or greater than a predetermined standard value, the control unit controls to close the shutoff valve in a compartment out of the tank compartment and the fuel cell compartment, in which the fuel gas detector that detects that the concentration is equal to or greater than the predetermined standard value is installed.

Advantageous Effects of Invention

With the configuration described above, it is possible to stop electric power generation by a fuel cell in an unlikely event of a fuel gas leak in at least one of a tank compartment and a fuel cell compartment.

DESCRIPTION OF EMBODIMENTS

An embodiment of the present invention will be described below based on the drawings. In this description, direction is defined as follows. First, a direction from the stern to the bow of the fuel cell ship is "front", and a direction from the bow to the stern is "rear". A horizontal direction perpendicular to a front-rear direction is defined as a left-right direction. At this time, when the fuel cell ship is moving forward, the left side is defined as "left" and the right side is defined as "right" when viewed from the operator. The upstream side in the gravity direction perpendicular to the front-back direction and the left-right direction is referred to as "up", and the downstream side is referred to as "down".

[1. Schematic Configuration of Fuel Cell Ship]

Figure 1:
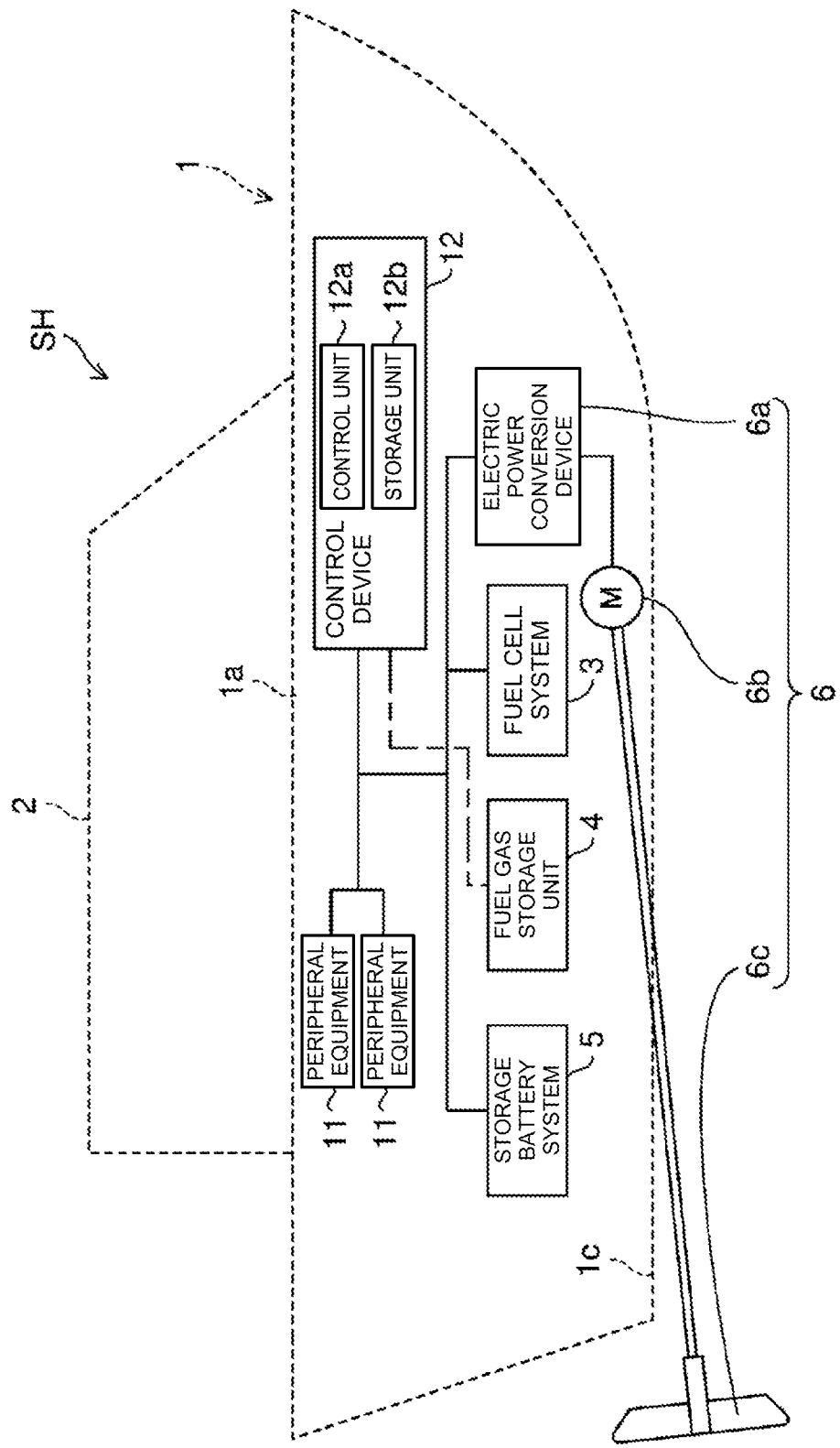
FIG. 1 is an explanatory diagram illustrating a schematic configuration of a fuel cell ship according to an embodiment of the present invention.

Firstly, a fuel cell ship SH according to the present embodiment will be described with reference to FIG. 1. FIG. 1 is an explanatory diagram illustrating a schematic configuration of the fuel cell ship SH. The fuel cell ship SH includes a hull 1 and a cabin 2. The cabin 2 is arranged on an upper surface of the hull 1.

The fuel cell ship SH further includes a fuel cell system 3, a fuel gas storage unit 4, a storage battery system 5, a propulsion device 6, a plurality of pieces of peripheral equipment 11, and a control device 12. In FIG. 1, a control signal or a high voltage power supply line is indicated by a solid line, and a control signal or a low voltage power supply line is indicated by a dashed line.

The fuel cell system 3 functions as a main power supply. The fuel cell system 3 consumes a fuel gas to generate electric power (specifically, DC electric power). The fuel gas is an example of a fuel, for example, a combustible gas. Typically, the fuel gas is hydrogen gas. The fuel cell system 3 supplies generated electric power to the propulsion device 6 and the peripheral equipment 11. The fuel cell system 3 can also supply electric power to the storage battery system 5 to charge the storage battery system 5.

The fuel gas storage unit 4 stores the fuel gas to be supplied to the fuel cell system 3. The fuel gas is supplied from the fuel gas storage unit 4 to the fuel cell system 3 via a fuel gas supply pipe 32 described later (see FIG. 2).

The storage battery system 5 includes a storage battery. The storage battery is, for example, a lithium secondary battery, but may also be a nickel-cadmium storage battery, a nickel-hydrogen storage battery, or the like. The storage battery system 5 functions as an auxiliary power source for supplying the stored electric power (specifically, DC electric power) to the propulsion device 6 and the peripheral equipment 11. Thus, the storage battery system 5 functions as an auxiliary power source, and thus, it is possible to compensate for a shortage of electric power supplied from the fuel cell system 3 to the propulsion device 6 or the like. The storage battery system 5 may supply electric power to the control device 12.

The propulsion device 6 is driven by electric power supplied from a fuel cell 31 described later (see FIG. 2) of the fuel cell system 3, and generates a propulsive force on the hull 1. That is, the fuel cell ship SH includes the propulsion device 6 that generates a propulsive force on the hull 1 by the electric power supplied from the fuel cell 31.

It is noted that the propulsion device 6 may be driven only by the electric power supplied from the storage battery included in the storage battery system 5, or may be driven by the electric power supplied from both the fuel cell 31 and the storage battery. That is, the propulsion device 6 may be driven by the electric power supplied from at least one of the fuel cell and the storage battery to generate the propulsive force on the hull 1.

The propulsion device 6 includes an electric power conversion device 6a, a propulsion motor 6b, and a propeller 6c. The electric power conversion device 6a converts the electric power supplied from the fuel cell system 3 into electric power according to the specifications of the propulsion motor 6b. For example, the electric power conversion device 6a converts DC electric power into AC electric power. In this case, the electric power conversion device 6a has, for example, an inverter. The propulsion motor 6b is driven by electric power (for example, AC electric power) supplied from the electric power conversion device 6a. When the propulsion motor 6b is driven, the rotational force of the propulsion motor 6b is transmitted to the propeller 6c. As a result, the propeller 6c rotates, and a propulsive force is generated on the hull 1. A configuration is also possible in which a marine gear is provided between the propulsion motor 6b and the propeller 6c.

Examples of the peripheral equipment 11 include a compressor, a solenoid valve, and a pump. Examples of the peripheral equipment 11 also include electrical equipment such as lighting equipment and air conditioning equipment, but the types of peripheral equipment 11 are not particularly limited.

The control device 12 controls the fuel cell system 3, the fuel gas storage unit 4, the storage battery system 5, the propulsion device 6, and a plurality of the peripheral equipment 11. The control device 12 is composed of, for example, one or more computers. The computer is, for example, a Programmable Logic Controller (PLC), but may also be an Electronic Control Unit (ECU). The control device 12 is supplied with electric power from a battery (for example, a lead battery) not illustrated or from the storage battery of the storage battery system 5.

The control device 12 has a control unit 12a and a storage unit 12b. The control unit 12a includes a processor such as a Central Processing Unit (CPU). The storage unit 12b includes a storage device and stores data and computer programs. Specifically, the storage unit 12b includes a main storage device such as a semiconductor memory and an auxiliary storage device such as a semiconductor memory, a solid state drive, and/or a hard disk drive. The storage unit 12b may also include removable media. The storage unit 12b corresponds to an example of a non-transitory computer-readable storage medium.

The processor of the control unit 12a executes a computer program stored in the storage device of the storage unit 12b, to control the fuel cell system 3, the fuel gas storage unit 4, the storage battery system 5, the propulsion device 6, and the plurality of pieces of peripheral equipment 11.

[2. Internal Structure of Fuel Cell Ship]

Figure 2:
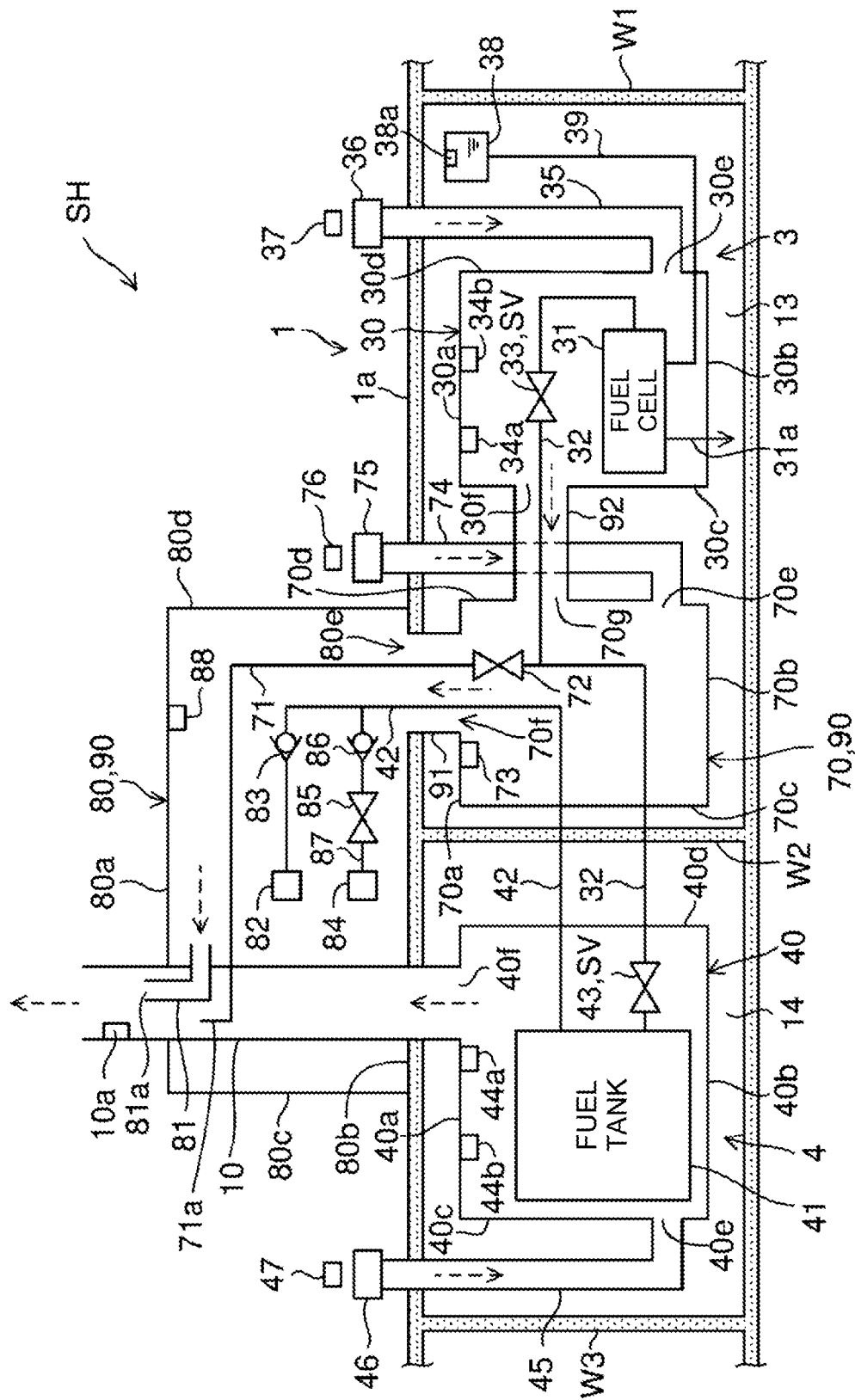
FIG. 2 is an explanatory diagram schematically illustrating an internal structure of the fuel cell ship.

Next, an internal structure of the fuel cell ship SH will be described with reference to FIG. 2. FIG. 2 is an explanatory diagram schematically illustrating the internal structure of the fuel cell ship SH. In FIG. 2, the air flow is indicated by a dashed line arrow. In FIG. 2, the right side of the drawing is the bow side, the left side of the drawing is the stern side, and each member is illustrated; however, the position of the member is not limited to the position illustrated in FIG. 2 as long as the connection relationship of the member is maintained.

The fuel cell ship SH includes an engine room 13 and a fuel room 14. The engine room 13 and the fuel room 14 are arranged below a deck 1a of the hull 1. The engine room 13 is located on the bow side with respect to the fuel room 14. Below the deck 1a, partition walls W1, W2 and W3 are located in order from the bow side to the stern side. The engine room 13 is separated from other spaces by the partition walls W1 and W2. The fuel room 14 is separated from other spaces by the partition walls W2 and W3. The partition walls W1 to W3 are made of, for example, fiber reinforced plastics (FRP), but may be iron plates.

(2-1. Configuration of Fuel Cell System)

The fuel cell system 3 of the fuel cell ship SH s located in the engine room 13. The fuel cell system 3 includes the fuel cell 31, the fuel gas supply pipe 32, and a fuel cell side shutoff valve 33. The fuel cell side shutoff valve 33 is an example of the peripheral equipment 11 (see FIG. 1).

The fuel cell 31 generates electric power (specifically, DC electric power) by an electrochemical reaction between the fuel gas being an example of fuel and an oxidant gas.

Typically, the oxidant gas is air and the oxidant is oxygen. That is, the fuel cell ship SH includes the fuel cell 31 that generate electric power by the electrochemical reaction of fuel.

The fuel cell 31 is a fuel cell stack composed of a plurality of stacked cells. For example, each cell of the fuel cell 31 has a solid polymer electrolyte membrane, an anode electrode, a cathode electrode, and a pair of separators. The solid polymer electrolyte membrane is sandwiched between the anode electrode and the cathode electrode. The anode electrode is a negative electrode (fuel electrode). The anode electrode includes an anode catalyst layer and a gas diffusion layer. The cathode electrode is a positive electrode (air electrode). The cathode electrode includes a cathode catalyst layer and a gas diffusion layer. The anode electrode, the solid polymer electrolyte membrane, and the cathode electrode form a Membrane-Electrode Assembly (MEA). The pair of separators sandwich the membrane-electrode assembly. Each separator has a plurality of grooves. Each groove of one separator forms a flow path for the fuel gas. Each groove of the other separator forms a flow path for the oxidant gas.

In the configuration described above of the fuel cell 31, hydrogen included in the fuel gas is decomposed into hydrogen ions and electrons by a catalyst on the anode electrode side. The hydrogen ions pass through the solid polymer electrolyte membrane and move to the cathode electrode side. On the other hand, the electrons move to the cathode electrode side through an external circuit. As a result, an electric current is generated (electricity is generated). On the cathode electrode side, oxygen included in the oxidant gas combines with the electrons flowing through the external circuit and the hydrogen ions passing through the solid polymer electrolyte membrane to generate water. The generated water is discharged outside the ship via a discharge pipe 31a.

The fuel cell 31 supplies generated electric power to the propulsion device 6 and the peripheral equipment 11 illustrated in FIG. 1. The fuel cell 31 may indirectly supply generated electric power to the propulsion device 6 and the peripheral equipment 11 via a circuit such as a DC/DC converter or the like.

The fuel gas supply pipe 32 is a fuel supply pipe for supplying, to the anode electrode of the fuel cell 31, fuel (for example, a fuel gas) stored in a fuel tank 41 described later of the fuel gas storage unit 4. That is, the fuel cell ship SH includes the fuel gas supply pipe 32 through which the fuel is supplied from the fuel tank 41 to the fuel cell 31.

The fuel cell side shutoff valve 33 is an example of a shutoff valve SV that opens or closes the flow path of the fuel gas supply pipe 32. The opening and closing of the fuel cell side shutoff valve 33 is controlled by the control unit 12a (see FIG. 1). Specifically, the fuel cell side shutoff valve 33 switches between supplying the fuel gas from the fuel tank 41 to the fuel cells 31 and stopping the supply of fuel gas based on the control of the control unit 12a. Although only one fuel cell side shutoff valve 33 is provided in the fuel gas supply pipe 32 in a fuel cell compartment 30 (described later), two or more may be provided.

The fuel cell ship SH further includes the fuel cell compartment 30. The fuel cell compartment 30 is a housing body that houses the fuel cell 31, and is arranged in the engine room 13. That is, the fuel cell ship SH includes the fuel cell compartment 30 in which the fuel cell 31 is installed.

The fuel cell compartment 30 has a hollow shape. For example, the fuel cell compartment 30 has a hollow and substantially rectangular parallelepiped shape. In this case, the outer walls of the fuel cell compartment 30 include, for example, a top wall 30a, a bottom wall 30b, a front wall (not illustrated), a back wall (not illustrated), a side wall 30c, and a side wall 30d. However, the top surface, bottom surface, front surface, back surface, and side surfaces of the fuel cell compartment 30 can be arbitrarily determined. The shape of the fuel cell compartment 30 is not particularly limited as long as the fuel cell compartment 30 has a space that can house the fuel cell 31. The fuel cell compartment 30 can also be considered as a container, chamber, or box for housing the fuel cell 31. The material of the outer wall of the fuel cell compartment 30 is, for example, FRP, but may be an iron plate.

A cell compartment air supply port 30e with an opening is provided on the side wall 30d of the fuel cell compartment 30. The cell compartment air supply port 30e is connected to a cell compartment air supply pipe 35, which will be described later. The cell compartment air supply port 30e may be provided on an outer wall other than the side wall 30d in the fuel cell compartment 30.

On the other hand, a cell compartment exhaust port 30f with an opening is provided on the side wall 30c of the fuel cell compartment 30. The cell compartment exhaust port 30f communicates with a duct compartment 90, which will be described later. The cell compartment exhaust port 30f may be provided on an outer wall other than the side wall 30c in the fuel cell compartment 30.

The fuel cell compartment 30 has an interior that is a closed space, with the exception of the cell compartment air supply port 30e and the cell compartment exhaust port 30f.

A part of the fuel gas supply pipe 32 described above and the fuel cell side shutoff valve 33 are housed in the fuel cell compartment 30. The fuel cell compartment 30 further houses a cell compartment internal gas detector 34a and a cell compartment internal fire detector 34b.

The cell compartment internal gas detector 34a is a fuel gas detector arranged inside the fuel cell compartment 30. For example, if the fuel gas is hydrogen gas, the cell compartment internal gas detector 34a includes a hydrogen gas detection sensor.

The cell compartment internal gas detector 34a is arranged on an inner surface of the top wall 30a located at an upper part of the fuel cell compartment 30. Hydrogen gas as the fuel gas is lighter than air and rises. Therefore, by arranging the cell compartment internal gas detector 34a on the top wall 30a of the fuel cell compartment 30, a leaked fuel gas can be reliably detected by the cell compartment internal gas detector 34a even if the fuel gas leaks in the fuel cell compartment 30. The installation position of the cell compartment internal gas detector 34a may be located on the most downstream side of the flow path through which the fuel gas flows when the fuel gas leaks in the fuel cell compartment 30.

When the cell compartment internal gas detector 34a detects a fuel gas in the fuel cell compartment 30, a detection signal is sent from the cell compartment internal gas detector 34a to the control unit 12a. As a result, the control unit 12a can control the fuel cell side shutoff valve 33 provided in the fuel gas supply pipe 32 to stop the supply of the fuel gas from the fuel tank 41 to the fuel cell 31. The details of control for opening and closing the fuel cell side shutoff valve 33 will be described later.

The cell compartment internal fire detector 34b is a fire detector arranged inside the fuel cell compartment 30. The cell compartment internal fire detector 34b includes, for example, one or more sensors among a smoke sensor for detecting smoke, a heat sensor for detecting heat, and a flame sensor for detecting flame. The cell compartment internal fire detector 34*b* may include a thermocouple type fire detector.

The cell compartment internal fire detector 34*b* is arranged on an inner surface of the top wall 30*a* located at an upper part of the fuel cell compartment 30. In an unlikely event of a fire inside the fuel cell compartment 30, the cell compartment internal fire detector 34*b* detects the fire and outputs, to the control unit 12*a*, a detection signal indicating that the fire has occurred. In this case, the control unit 12*a* can control the fuel cell side shutoff valve 33 to stop the supply of the fuel gas from the fuel tank 41 to the fuel cell 31. As a result, in the fuel cell compartment 30, the risk of explosion due to ignition of the fuel gas can be reduced as much as possible.

The cell compartment air supply pipe 35 is connected to the fuel cell compartment 30. The cell compartment air supply pipe 35 extends from the cell compartment air supply port 30*e* of the fuel cell compartment 30, to the deck 1*a* and is exposed from the upper surface of the deck 1*a*.

A cell compartment air supply device 36 and a cell compartment external gas detector 37 are arranged at an end portion on the deck 1*a* side of the cell compartment air supply pipe 35. The cell compartment air supply device 36 and the cell compartment external gas detector 37 are located above the deck 1*a*.

The cell compartment air supply device 36 includes, for example, an inexpensive non-explosion-proof air supply fan, but may include an explosion-proof air supply fan. The drive of the cell compartment air supply device 36 is controlled by the control unit 12*a*. One or more filters (not illustrated) may be arranged in the cell compartment air supply device 36. The filter removes, for example, dust or sea salt particles.

The cell compartment air supply device 36 supplies air outside the fuel cell compartment 30 to the inside of the fuel cell compartment 30 via the cell compartment air supply pipe 35 and the cell compartment air supply port 30*e*. The air inside the fuel cell compartment 30 is discharged to the duct compartment 90 via the cell compartment exhaust port 30*f*. In this way, the inside of the fuel cell compartment 30 is ventilated. As a result, it is possible to prevent combustible gas (for example, the fuel gas leaking from the fuel cell 31) from being retained in the fuel cell compartment 30.

The cell compartment external gas detector 37 detects combustible gas (for example, hydrogen gas floating around the hull 1) flowing into the fuel cell compartment 30 from the outside. The cell compartment external gas detector 37 is, for example, a combustible gas sensor such as a hydrogen gas sensor. The cell compartment external gas detector 37 is arranged on a side opposite to the cell compartment air supply pipe 35 with respect to the cell compartment air supply device 36, that is, on the upstream side of the air flow from the outside to the inside of the fuel cell compartment 30. The cell compartment external gas detector 37 may include a gas sensor that detects a combustible gas other than hydrogen gas. Examples of combustible gases other than hydrogen gas include methane, ethane, propane, and carbon monoxide.

The cell compartment external gas detector 37 outputs, for example, a detection signal indicating the concentration of combustible gas to the control unit 12*a*. As a result, the control unit 12*a* can determine, based on the detection signal, whether the concentration of the combustible gas is equal to or higher than a standard value. Then, if the concentration is equal to or higher than the standard value, the control unit 12*a* can control the fuel cell side shutoff valve 33 to stop the supply of fuel gas from the fuel tank 41 to the fuel cell 31. The above-mentioned standard value may be determined based on experiments and/or experience.

The fuel cell ship SH further includes a cooling medium tank 38 and a cooling medium pipe 39. The cooling medium tank 38 stores cooling medium for cooling the fuel cells 31. The cooling medium is, for example, an antifreeze liquid having low electrical conductivity. The antifreeze liquid is, for example, a liquid obtained by mixing pure water and ethylene glycol in a predetermined ratio. The cooling medium tank 38 is sealed, but an upper portion may be open.

The cooling medium pipe 39 is a pipe for circulating the cooling medium between the fuel cells 31 and a heat exchanger (not illustrated). A circulation pump (not illustrated) is also provided at a location along the cooling medium pipe 39. The fuel cells 31 are cooled by driving the circulation pump to supply the cooling medium from the heat exchanger to the fuel cells 31 via the cooling medium pipe 39. The cooling medium supplied for cooling the fuel cells 31 is also supplied, via the cooling medium pipe 39, to the cooling medium tank 38, at which a volume change due to a temperature change of the cooling medium is absorbed and the amount of the cooling medium liquid is monitored.

A cooling tank internal gas detector 38*a* is provided in an upper portion inside the cooling medium tank 38. The cooling tank internal gas detector 38*a* is a fuel gas detector that detects the fuel gas existing in the cooling medium tank 38. As the fuel gas existing in the cooling medium tank 38, for example, a fuel gas which is leaked in the fuel cell 31 and then enters into the cooling medium tank 38 via the cooling medium pipe 39 can be considered. The fuel gas detection result (for example, fuel gas concentration information) by the cooling tank internal gas detector 38*a* is sent to the control unit 12*a*. As a result, the control unit 12*a* determines, based on the detection result of the cooling tank internal gas detector 38*a*, whether there is a fuel gas leak in the fuel cells 31, and if there is a leak, the control unit 12*a* can, for example, perform control to stop electric power generation by the fuel cells 31.

(2-2. Configuration of Fuel Gas Storage Unit)

The fuel gas storage unit 4 of the fuel cell ship SH includes the fuel tank 41, a gas filling pipe 42, and a tank side shutoff valve 43. The tank side shutoff valve 43 is an example of the peripheral equipment 11.

The fuel tank 41 stores the fuel gas to be supplied to the fuel cells 31. In FIG. 2, for convenience, only one fuel tank 41 is illustrated, but the number of fuel tanks 41 is not particularly limited and there may be a plurality of the fuel tanks 41.

The gas filling pipe 42 is a pipe for replenishing the fuel tank 41 with the fuel gas or filling the fuel tank 41 with an inert gas. One end side of the gas filling pipe 42 is connected to the fuel tank 41. The other end side of the gas filling pipe 42 is branched into two, and these ends are connected to a fuel gas filling port 82 and an inert gas filling port 84, respectively. The fuel gas filling port 82 and the inert gas filling port 84 are provided in the duct compartment 90 (particularly an upper duct compartment 80) described later.

The above-mentioned inert gas is, for example, nitrogen gas. For example, if the fuel gas remains in the fuel tank 41 when performing maintenance such as inspection or repair of the fuel cell ship SH in the dock (dry dock), there is a danger that an explosion may occur when the fuel gas ignites for some reason. Therefore, at the time of maintenance of the fuel cell ship SH, the fuel tank 41 is filled with the inert gas, and the fuel gas is removed from the fuel tank 41. As a result, it possible to avoid the danger of explosion.

In the fuel gas supply pipe 32 described above, a side opposite to the connection side with the fuel cell 31 is connected to the fuel tank 41. That is, the fuel tank 41 and the fuel cell 31 are connected via the fuel gas supply pipe 32.

The tank side shutoff valve 43 is an example of a shutoff valve SV that opens or closes the flow path of the fuel gas supply pipe 32. The opening and closing of the tank side shutoff valve 43 is controlled by the control unit 12a. More specifically, the tank side shutoff valve 43 switches between supplying the fuel gas from the fuel tank 41 to the fuel cells 31 and stopping the supply of fuel gas based on the control of the control unit 12a. Although only one tank side shutoff valve 43 is provided in the fuel gas supply pipe 32 in a tank compartment 40 described later, two or more tank side shutoff valves 43 may be provided.

That is, it can be said that the fuel gas supply pipe 32 connecting the fuel tank 41 and the fuel cell 31 has at least two shutoff valves SV. The at least two shutoff valves SV include the fuel cell side shutoff valve 33 and the tank side shutoff valve 43.

The fuel cell ship SH further includes the tank compartment 40. The tank compartment 40 is a housing body that houses the fuel tank 41. That is, the fuel cell ship SH includes the tank compartment 40 in which a fuel tank 41 that stores a fuel gas is installed. The tank compartment 40 is arranged in the fuel room 14.

The tank compartment 40 has a hollow shape. For example, the tank compartment 40 has a hollow and substantially rectangular parallelepiped shape. In this case, the outer walls of the tank compartment 40 include, for example, a top wall 40a, a bottom wall 40b, a front wall (not illustrated), a back wall (not illustrated), a side wall 40c, and a side wall 40d. However, the top surface, bottom surface, front surface, back surface, and side surfaces of the tank compartment 40 can be arbitrarily determined. The shape of the tank compartment 40 is not particularly limited as long as the tank compartment 40 has a space that can house at least one fuel tank 41. The tank compartment 40 can also be considered as a container, chamber, or box for housing the fuel tank 41. The material of the outer wall of the tank compartment 40 is, for example, FRP, but may be an iron plate.

A tank compartment air supply port 40e with an opening is provided on the side wall 40c of the tank compartment 40. The tank compartment air supply port 40 is connected to a tank compartment air supply pipe 45 described later. The tank compartment air supply port 40e may be provided on an outer wall other than the side wall 40c in the tank compartment 40.

On the other hand, a tank compartment exhaust port 40f with an opening is provided on the top wall 40a of the tank compartment 40. The tank compartment exhaust port 40f communicates with a vent pipe 10. The vent pipe 10 is a pipe for guiding air inside the tank compartment 40 to the outside of the ship. The tank compartment exhaust port 40f may be provided on an outer wall other than the top wall 40a in the tank compartment 40.

The tank compartment 40 has an interior that is a closed space except for the tank compartment air supply port 40e and the tank compartment exhaust port 40f.

A part of the fuel gas supply pipe 32 described above and the tank side shutoff valve 43 are housed in the tank compartment 40. The tank compartment 40 further houses a tank compartment internal gas detector 44a and a tank compartment internal fire detector 44b.

The tank compartment internal gas detector 44a is a fuel gas detector arranged inside the tank compartment 40. For example, if the fuel gas is hydrogen gas, the tank compartment internal gas detector 44a includes a hydrogen gas detection sensor.

The tank compartment internal gas detector 44a is arranged on the top wall 40a located at the upper part of the tank compartment 40 to be close to the tank compartment exhaust port 40f or inside the tank compartment exhaust port 40f. In the unlikely event that the fuel gas leaks from the fuel tank 41 in the tank compartment 40, the leaked fuel gas goes toward the vent pipe 10 through the tank compartment exhaust port 40f. That is, the tank compartment exhaust port 40f is located on the most downstream side of the flow path through which the fuel gas flows when the fuel gas leaks inside the tank compartment 40. Therefore, by arranging the tank compartment internal gas detector 44a at a position near the tank compartment exhaust port 40f or inside the tank compartment exhaust port 40f, a fuel gas leaked in the tank compartment 40 can be reliably detected by the tank compartment internal gas detector 44a located on the most downstream side of the flow path, regardless of where the fuel gas leaks.

When the tank compartment internal gas detector 44a detects a fuel gas inside the tank compartment 40, a detection signal is sent from the tank compartment internal gas detector 44a to the control unit 12a. As a result, the control unit 12a can control the tank side shutoff valve 43 provided in the fuel gas supply pipe 32 to stop the supply of the fuel gas from the fuel tank 41 to the fuel cell 31. The details of control for opening and closing the tank side shutoff valve 43 will be described later.

The tank compartment internal fire detector 44b is a fire detector arranged inside the tank compartment 40. The tank compartment internal fire detector 44b includes, for example, one or more sensors among a smoke sensor for detecting smoke, a heat sensor for detecting heat, and a flame sensor for detecting flame. The tank compartment internal fire detector 44b may include a thermocouple type fire detector.

The tank compartment internal fire detector 44b is arranged on an inner surface of the top wall 40a located at an upper part of the tank compartment 40. In an unlikely event of a fire inside the tank compartment 40, the tank compartment internal fire detector 44b detects the fire and outputs, to the control unit 12a, a detection signal indicating that the fire has occurred. In this case, the control unit 12a can control the tank side shutoff valve 43 to stop the supply of the fuel gas from the fuel tank 41 to the fuel cell 31. As a result, in the tank compartment 40, the risk of explosion due to ignition of the fuel gas can be reduced as much as possible.

The tank compartment air supply pipe 45 is connected to the tank compartment 40. The tank compartment air supply pipe 45 extends from the tank compartment air supply port 40e of the tank compartment 40 to the deck 1a, and is exposed from an upper surface of the deck 1a.

A tank compartment air supply device 46 and a tank compartment external gas detector 47 are arranged at an end portion on the deck 1a side of the tank compartment air supply pipe 45. The tank compartment air supply device 46 and the tank compartment external gas detector 47 are located above the deck 1a.

The tank compartment air supply device 46 includes, for example, an inexpensive non-explosion-proof air supply fan, but may include an explosion-proof air supply fan. The drive of the tank compartment air supply device 46 is controlled by the control unit 12a. One or more filters (not illustrated) may be arranged in the tank compartment air supply device 46. The filter removes, for example, dust or sea salt particles.

The tank compartment air supply device 46 supplies air outside the tank compartment 40 to the inside of the tank compartment 40 via the tank compartment air supply pipe 45 and the tank compartment air supply port 40e. The air inside the tank compartment 40 is discharged to the vent pipe 10 via the tank compartment exhaust port 40f. In this way, the inside of the tank compartment 40 is ventilated. As a result, even if the fuel gas leaks from the fuel tank 41 in the tank compartment 40, the retention of the fuel gas can be suppressed.

The tank compartment external gas detector 47 detects combustible gas (for example, hydrogen gas floating around the hull 1) flowing into the tank compartment 40 from the outside. The tank compartment external gas detector 47 is, for example, a combustible gas sensor such as a hydrogen gas sensor. The tank compartment external gas detector 47 is arranged on a side opposite to the tank compartment air supply pipe 45 with respect to the tank compartment air supply device 46, that is, on the upstream side of the air flow from the outside to the inside of the tank compartment 40. The tank compartment external gas detector 47 may include a gas sensor that detects a combustible gas other than hydrogen gas.

The tank compartment external gas detector 47 outputs, to the control unit 12a, for example, a detection signal indicating the concentration of combustible gas. As a result, the control unit 12a can determine, based on the detection signal, whether the concentration of the combustible gas is equal to or greater than a standard value. Then, if the concentration is equal to or greater than the standard value, the control unit 12a can control the tank side shutoff valve 43 to stop the supply of the fuel gas from the fuel tank 41 to the fuel cell 31. The above-mentioned standard value may be determined based on experiments and/or experience.

(2-3. Duct Compartment)

The fuel cell ship SH further includes a lower duct compartment 70 and an upper duct compartment 80. Here, the lower duct compartment 70 and the upper duct compartment 80 are collectively referred to as a duct compartment 90. The duct compartment 90 is a housing body that houses various types of pipes. For example, the duct compartment 90 houses a part of the fuel gas supply pipe 32. That is, the fuel cell ship SH further includes the duct compartment 90 that houses a part of the fuel gas supply pipe 32. The inside of the lower duct compartment 70 and the inside of the upper duct compartment 80 communicate with each other via a duct communication portion 91. In the following, details of the lower duct compartment 70 and the upper duct compartment 80 will be described.

<2-3-1. Lower Duct Compartment>

The lower duct compartment 70 is arranged below the deck 1a.

More specifically, the lower duct compartment 70 is arranged in the engine room 13. In the engine room 13, the lower duct compartment 70 is located on the stern side with respect to the fuel cell compartment 30. That is, below the deck 1a, the lower duct compartment 70 is located between the fuel cell compartment 30 and the tank compartment 40. The lower duct compartment 70 houses a part of the fuel gas supply pipe 32 and a part of the gas filling pipe 42.

Here, the "part of the fuel gas supply pipe 32" housed in the lower duct compartment 70 refers to a portion of the fuel gas supply pipe 32 located between the fuel cell compartment 30 and the tank compartment 40. The "part of the gas filling pipe 42" housed in the lower duct compartment 70 refers to a portion of the gas filling pipe 42 located between the tank compartment 40 and the upper duct compartment 80.

The material of the lower duct compartment 70 is, for example, FRP, but may be an iron plate. The lower duct compartment 70 has a hollow shape. For example, the lower duct compartment 70 has a hollow and substantially rectangular parallelepiped shape. In this case, the outer walls of the lower duct compartment 70 include, for example, a top wall 70a, a bottom wall 70b, a front wall (not illustrated), a back wall (not illustrated), a side wall 70c, and a side wall 70d. However, the top surface, bottom surface, front surface, back surface, and side surfaces of the lower duct compartment 70 can be arbitrarily determined. The shape of the lower duct compartment 70 is not particularly limited as long as the lower duct compartment 70 has a space that can house a part of the fuel gas supply pipe 32 and the like. The lower duct compartment 70 can also be regarded as a container, a chamber, or a box for housing a part of the fuel gas supply pipe 32 and the like.

A lower duct compartment air supply port 70e with an opening is provided in the side wall 70d of the lower duct compartment 70. The lower duct compartment air supply port 70e is connected to a lower duct compartment air supply pipe 74 described later. The lower duct compartment air supply port 70e may be provided on an outer wall other than the side wall 70d in the lower duct compartment 70.

On the other hand, a lower duct compartment communication port 70f with an opening is provided in the top wall 70a of the lower duct compartment 70. The lower duct compartment communication port 70f communicates with the duct communication portion 91 described above. The lower duct compartment communication port 70f may be provided on an outer wall other than the top wall 70a in the lower duct compartment 70.

A cell compartment communication port 70g with an opening is provided in the side wall 70d of the lower duct compartment 70. The cell compartment communication port 70g is connected to the cell compartment exhaust port 30f of the fuel cell compartment 30 described above via a communication pipe 92. As a result, the air inside the fuel cell compartment 30 flows into the lower duct compartment 70 via the cell compartment exhaust port 30f, the communication pipe 92, and the cell compartment communication port 70g. The cell compartment communication port 70g may be provided on an outer wall other than the side wall 70d in the lower duct compartment 70.

The communication pipe 92 includes, for example, a double pipe having an inner pipe and an outer pipe. Examples of the inner pipe include the fuel gas supply pipe 32. The outer pipe is located on the outside of the inner pipe in the radial direction. The gas inside the fuel cell compartment 30 travels between the inner pipe and the outer pipe of the communication pipe 92, from the cell compartment exhaust port 30f to the cell compartment communication port 70g of the lower duct compartment 70.

The lower duct compartment 70 has a closed space inside except for the lower duct compartment air supply port 70e, the lower duct compartment communication port 70f, and the cell compartment communication port 70g.

The lower duct compartment 70 houses a part of a fuel gas discharge pipe 71. The fuel gas discharge pipe 71 is a fuel discharge pipe provided by branching from the fuel gas supply pipe 32 located in the lower duct compartment 70.

For example, the fuel gas discharge pipe 71 is provided by branching from the fuel gas supply pipe 32 between the two shutoff valves SV.

More specifically, the fuel gas discharge pipe 71 is provided by branching from the fuel gas supply pipe 32 between the tank side shutoff valve 43 in the tank compartment 40 and the fuel cell side shutoff valve 33 in the fuel cell compartment 30. The fuel gas discharge pipe 71 extends from the inside of the lower duct compartment 70 to the inside of the upper duct compartment 80 via the lower duct compartment communication port 70*f* and the duct communication portion 91, and further communicates with the inside of the vent pipe 10. Therefore, the "part of the fuel gas discharge pipe 71" housed in the lower duct compartment 70 refers to a portion of the fuel gas discharge pipe 71 located between the point of the branching from the fuel gas supply pipe 32 and the upper duct compartment 80.

The lower duct compartment 70 further houses the release valve 72. The release valve 72 is an on-off valve installed in the fuel gas discharge pipe 71 to open or close the flow path of the fuel gas discharge pipe 71. The release valve 72 is an example of peripheral equipment 11. The opening and closing of the release valve 72 are controlled by the control unit 12*a*.

As described above, when the shutoff valve SV installed in the tank compartment 40 is the tank side shutoff valve 43 and the shutoff valve SV installed in the fuel cell compartment 30 is the fuel cell side shutoff valve 33, the fuel cell ship SH further includes, between the tank side shutoff valve 43 and the fuel cell side shutoff valve 33, the fuel gas discharge pipe 71 provided by branching from the fuel gas supply pipe 32 and a release valve 72 installed in the fuel gas discharge pipe 71. The release valve 72 may be installed in the upper duct compartment 80.

The lower duct compartment 70 further houses a lower duct compartment internal gas detector 73. The lower duct compartment internal gas detector 73 is a fuel gas detector arranged inside the lower duct compartment 70. For example, if the fuel gas is hydrogen gas, the lower duct compartment internal gas detector 73 includes a hydrogen gas detection sensor.

The lower duct compartment internal gas detector 73 is arranged on the top wall 70*a* located at an upper portion of the lower duct compartment 70 to be close to the lower duct compartment communication port 70*f* or inside the lower duct compartment communication port 70*f*. In the unlikely event that the fuel gas leaks from the fuel gas supply pipe 32 in the lower duct compartment 70, the leaked fuel gas goes toward the upper duct compartment 80 through the lower duct compartment communication port 70*f*. That is, the lower duct compartment communication port 70*f* is located on the most downstream side of the flow path through which the fuel gas flows when the fuel gas leaks in the lower duct compartment 70. Therefore, by arranging the lower duct compartment internal gas detector 73 at a position close to the lower duct compartment communication port 70*f* or inside the lower duct compartment communication port 70*f*, a fuel gas leaked in the lower duct compartment 70 can be reliably detected by the lower duct compartment internal gas detector 73 located on the most downstream side of the flow path, regardless of where the fuel gas leaks.

If the lower duct compartment internal gas detector 73 detects the fuel gas in the lower duct compartment 70, a detection signal is sent from the lower duct compartment internal gas detector 73 to the control unit 12*a*. As a result, the control unit 12*a* can control the shutoff valves SV provided in the fuel gas supply pipe 32 to stop the supply of fuel gas from the fuel tank 41 to the fuel cell 31.

The lower duct compartment 70 may further house a fire detector that detects a fire inside the lower duct compartment 70.

The lower duct compartment air supply pipe 74 is connected to the lower duct compartment 70. The lower duct compartment air supply pipe 74 extends from the lower duct compartment air supply port 70*e* of the lower duct compartment 70 to the deck 1*a* and is exposed from the upper surface of the deck 1*a*.

A lower duct compartment air supply device 75 and a lower duct compartment external gas detector 76 are arranged at an end portion on the deck 1*a* side of the lower duct compartment air supply pipe 74. The lower duct compartment air supply device 75 and the lower duct compartment external gas detector 76 are located above the deck 1*a*.

The lower duct compartment air supply device 75 includes, for example, an inexpensive non-explosion-proof air supply fan, but may include an explosion-proof air supply fan. The drive of the lower duct compartment air supply device 75 is controlled by the control unit 12*a*. One or more filters (not illustrated) may be arranged in the lower duct compartment air supply device 75. The filter removes, for example, dust or sea salt particles.

The lower duct compartment air supply device 75 supplies the air outside the lower duct compartment 70 (duct compartment 90) to the inside of the lower duct compartment 70 via the lower duct compartment air supply pipe 74 and the lower duct compartment air supply port 70*e*. The air inside the lower duct compartment 70 is discharged to the upper duct compartment 80 through the lower duct compartment communication port 70*f*. In this way, the inside of the lower duct compartment 70 is ventilated. As a result, even if the fuel gas leaks from the fuel gas supply pipe 32 in the lower duct compartment 70, retention of the fuel gas can be suppressed.

The lower duct compartment external gas detector 76 detects combustible gas (for example, hydrogen gas floating around the hull 1) flowing into the duct compartment 90 from the outside. The lower duct compartment external gas detector 76 is, for example, a combustible gas sensor such as a hydrogen gas sensor. The lower duct compartment external gas detector 76 is arranged on a side opposite to the lower duct compartment air supply pipe 74 with respect to the lower duct compartment air supply device 75, that is, on the upstream side of the air flow from the outside to the inside of the duct compartment 90. The lower duct compartment external gas detector 76 may include a gas sensor that detects a combustible gas other than hydrogen gas.

The lower duct compartment external gas detector 76 outputs, for example, a detection signal indicating the concentration of combustible gas to the control unit 12*a*. As a result, the control unit 12*a* can determine, based on the detection signal, whether the concentration of the combustible gas is equal to or higher than a standard value. Then, if the concentration is equal to or higher than the standard value, the control unit 12*a* can control the shutoff valves SV to stop the supply of fuel gas from the fuel tank 41 to the fuel cell 31. The above-mentioned standard value may be determined based on experiments and/or experience.

<2-3-2. Upper Duct Compartment>

The upper duct compartment 80 is arranged on the deck 1*a*. More specifically, the upper duct compartment 80 is arranged on the deck 1*a* to cover an area partially including the lower duct compartment 70 and the tank compartment 40. The upper duct compartment 80 houses a part of the fuel gas discharge pipe 71 and a part of the gas filling pipe 42.

Here, the "part of the fuel gas discharge pipe 71" housed in the upper duct compartment 80 refers to a portion of the fuel gas discharge pipe 71 that extends from the lower duct compartment 70 toward the vent pipe 10. The "part of the gas filling pipe 42" housed in the upper duct compartment 80 refers to a portion of the gas filling pipe 42 that extends from the lower duct compartment 70 to the fuel gas filling port 82 described later.

The material of the upper duct compartment 80 is, for example, FRP, but may be an iron plate. The upper duct compartment 80 has a hollow shape. For example, the upper duct compartment 80 has a hollow and substantially rectangular parallelepiped shape. In this case, the outer walls of the upper duct compartment 80 include, for example, a top wall 80a, a bottom wall 80b, a front wall (not illustrated), a back wall (not illustrated), a side wall 80c, and a side wall 80d. However, the top surface, bottom surface, front surface, back surface, and side surfaces of the upper duct compartment 80 can be arbitrarily determined. The shape of the upper duct compartment 80 is not particularly limited as long as the upper duct compartment 80 has a space that can house a part of the fuel gas discharge pipe 71 and the like. The upper duct compartment 80 can also be regarded as a container, a chamber, or a box for housing the part of the fuel gas discharge pipe 71 and the like.

The fuel gas discharge pipe 71, as described above, communicates with the inside of the vent pipe 10. Thus, when the release valve 72 is opened, the gas inside the fuel gas discharge pipe 71 (for example, the fuel gas) flows from an end portion 71a of the fuel gas discharge pipe 71 into the vent pipe 10 and is released from the vent pipe 10 to outside the ship. Here, it is desirable that, in the vent pipe 10, the end portion 71a of the fuel gas discharge pipe 71 faces upward, that is, faces the open port side of the vent pipe 10. In this case, the discharge direction of gas discharged from the end portion 71a of the fuel gas discharge pipe 71 is upward.

For example, if the fuel gas is discharged sideways from the end portion 71a of the fuel gas discharge pipe 71, the discharged fuel gas reaches the inner wall surface of the vent pipe 10 and then flows downward. This may result in unwanted detection by the tank compartment internal gas detector 44a in the tank compartment 40. By the end portion 71a of the fuel gas discharge pipe 71 facing upward inside the vent pipe 10 as described above, it is possible to reduce unwanted detection by the tank compartment internal gas detector 44a due to the fuel gas discharged from the end portion 71a.

An upper duct compartment air supply port 80e with an opening is provided in the bottom wall 80b of the upper duct compartment 80. The upper duct compartment air supply port 80e communicates with the duct communication portion 91. Therefore, the upper duct compartment 80 communicates with the lower duct compartment 70 via the upper duct compartment air supply port 80e, the duct communication portion 91, and the lower duct compartment communication port 70f. The upper duct compartment air supply port 80e may be provided on an outer wall other than the bottom wall 80b in the upper duct compartment 80.

The upper duct compartment 80 has a vent pipe communication portion 81. The vent pipe communication portion 81 is a pipe communicating between the inside of the upper duct compartment 80 and the vent pipe 10. In FIG. 2, the vent pipe communication portion 81 is illustrated as a portion having a shape bent upward from the horizontal direction, but the shape of the vent pipe communication portion 81 is not limited to the shape in FIG. 2. The reason why the vent pipe communication portion 81 is bent upward is similar to the reason why the end portion 71a of the fuel gas discharge pipe 71 is bent upward. That is, the vent pipe communication portion 81 is bent upward to reduce unwanted detection by the tank compartment internal gas detector 44a due to the fuel gas discharged from the vent pipe communication portion 81, which will be described later.

The vent pipe 10 extends upward from the tank compartment 40 and passes through the interior of the upper duct compartment 80. More specifically, the vent pipe 10 passes through the bottom wall 80b of the upper duct compartment 80, enters the inside of the vent pipe 10, and passes through the top wall 80a. The vent pipe communication portion 81 is provided in the upper duct compartment 80 to penetrate through the side wall of the vent pipe 10. As a result, the upper duct compartment 80 communicates with the vent pipe 10 via the vent pipe communication portion 81.

Therefore, the air inside the upper duct compartment 80 is discharged to the outside of the ship through the vent pipe communication portion 81 and the vent pipe 10. In this way, it is possible to ventilate the inside of the upper duct compartment 80. If the fuel gas leaks from the fuel gas discharge pipe 71 in the upper duct compartment 80, the leaked fuel gas is discharged to the outside of the ship through the vent pipe communication portion 81 and the vent pipe 10. In this way, it is possible to prevent the leaked fuel gas from being retained in the upper duct compartment 80.

The upper duct compartment 80 and the lower duct compartment 70 communicate with each other via the duct communication portion 91. As a result, (1) air taken into the inside of the lower duct compartment 70 via the lower duct compartment air supply pipe 74, (2) a fuel gas leaked from the fuel gas supply pipe 32 in the lower duct compartment 70 for some reason, and (3) air or a fuel gas discharged from the fuel cell compartment 30 to the lower duct compartment 70 via the communication pipe 92 can be discharged to the outside of the ship via the upper duct compartment 80 and the vent pipe 10. In this way, it is possible to suppress the retention of the fuel gas inside the lower duct compartment 70 and inside the fuel cell compartment 30.

The fuel gas filling port 82 and a fuel gas check valve 83 are provided in the upper duct compartment 80. The fuel gas filling port 82 is connected to the gas filling pipe 42. The fuel gas check valve 83 is provided in the gas filling pipe 42. More specifically, the fuel gas check valve 83 is located between the point where an inert gas pipe 87 (described later) branches from the gas filling pipe 42 and the fuel gas filling port 82.

The fuel gas supplied from the fuel gas filling port 82 travels through the fuel gas check valve 83 and the gas filling pipe 42, and is supplied to the fuel tank 41 in the tank compartment 40. As a result, the fuel gas is filled in the fuel tank 41 and stored. The fuel gas check valve 83 is provided to prevent backflow of the fuel gas from the fuel tank 41 side to the fuel gas filling port 82.

The upper duct compartment 80 is further provided with the inert gas filling port 84, an on-off valve 85, an inert gas check valve 86, and the inert gas pipe 87. The inert gas filling port 84 is connected to the inert gas pipe 87. The inert gas pipe 87 is provided by branching from the gas filling pipe 42 in the upper duct compartment 80. The on-off valve 85 and the inert gas check valve 86 are provided in the inert gas pipe 87. In the inert gas pipe 87, the on-off valve 85 is located between the inert gas filling port 84 and the inert gas check valve 86.

The on-off valve 85 opens or closes the flow path of the inert gas pipe 87. In a configuration in which the inert gas check valve 86 is provided in the inert gas pipe 87, installation of the on-off valve 85 may be omitted.

When inert gas is supplied to the inert gas filling port 84 and the on-off valve 85 opens the flow path of the inert gas pipe 87 in a state in which the fuel gas is not supplied to the fuel gas filling port 82, the inert gas is supplied to the fuel tank 41 in the tank compartment 40 through the inert gas check valve 86, and via the inert gas pipe 87 and the gas filling pipe 42. In addition, the tank side shutoff valve 43 opens the flow path of the fuel gas supply pipe 32, the fuel cell side shutoff valve 33 closes the flow path of the fuel gas supply pipe 32, and the release valve 72 opens the flow path of the fuel gas discharge pipe 71, whereby the fuel gas remaining in the fuel tank 41 is discharged to the vent pipe 10 via the fuel gas supply pipe 32 and the fuel gas discharge pipe 71. As a result, the fuel gas can be removed from the fuel tank 41 (purge process).

There may be a pipe from the gas filling pipe 42 that is directly connected to the fuel gas supply pipe 32 between the fuel tank 41 and the tank side shutoff valve 43 (tank method). In this configuration, when performing a purge process for the fuel tank 41 using the inert gas, it is necessary to fill the fuel tank 41 with the inert gas in a state in which the tank side shutoff valve 43 is closed, and after that, to open the tank side shutoff valve 43 for the purpose of facilitating the release of the inert gas from the fuel tank 41.

The fuel gas filling port 82 and the inert gas filling port 84 are provided in the upper duct compartment 80 as described above. More specifically, the fuel gas filling port 82 and the inert gas filling port 84 are located at a boundary surface between the inside and the outside of the upper duct compartment 80. That is, "the fuel gas filling port 82 and the inert gas filling port 84 are provided in the upper duct compartment 80" includes a case where the fuel gas filling port 82 and the inert gas filling port 84 are provided at the boundary surface of the upper duct compartment 80.

An upper duct compartment internal gas detector 88 is housed in the upper duct compartment 80. The upper duct compartment internal gas detector 88 is a fuel gas detector arranged inside the upper duct compartment 80. For example, if the fuel gas is hydrogen gas, the upper duct compartment internal gas detector 88 includes a hydrogen gas detection sensor.

The upper duct compartment internal gas detector 88 is arranged on the top wall 80*a* located in an upper portion of the upper duct compartment 80. Hydrogen gas as the fuel gas is lighter than air and rises. Therefore, if the fuel gas leaks in the upper duct compartment 80, the leaked fuel gas can be reliably detected by the upper duct compartment internal gas detector 88. To more reliably detect the fuel gas leaked in the upper duct compartment 80, the upper duct compartment internal gas detector 88 may be arranged at a position close to the vent pipe communication portion 81.

If the upper duct compartment internal gas detector 88 detects the fuel gas in the upper duct compartment 80, a detection signal is sent from the upper duct compartment internal gas detector 88 to the control unit 12*a*. As a result, the control unit 12*a* can control the shutoff valves SV provided in the fuel gas supply pipe 32 to stop the supply of fuel gas from the fuel tank 41 to the fuel cell 31.

The upper duct compartment 80 may further house a fire detector that detects a fire inside the upper duct compartment 80.

(2-4. Supplementary Information about Vent Pipe)

Inside the vent pipe 10, a vent pipe internal gas detector 10*a* is provided further on the downstream side than a discharge port 81*a* of the vent pipe communication portion 81. The downstream side refers to the downstream side in the air flow direction when the air inside the tank compartment 40 flows inside the vent pipe 10 and is discharged to the outside of the ship. For example, if the fuel gas is hydrogen gas, the vent pipe internal gas detector 10*a* is configured by a diffusion type or suction type hydrogen gas detection sensor. A detection signal from the vent pipe internal gas detector 10*a* is sent to the control unit 12*a*. The control of the control unit 12*a* based on the detection result of the vent pipe internal gas detector 10*a* will be described later.

[3. Opening and Closing Control of Shutoff Valves]

As described above, in the fuel gas supply pipe 32, at least one tank side shutoff valve 43 is provided in the tank compartment 40, and at least one fuel cell side shutoff valve 33 is provided in the fuel cell compartment 30. That is, at least one shutoff valve SV (the tank side shutoff valve 43, the fuel cell side shutoff valve 33) is installed in each of the tank compartment 40 and the fuel cell compartment 30.

The tank compartment internal gas detector 44*a* is installed in the tank compartment 40, and the cell compartment internal gas detector 34*a* is installed in the fuel cell compartment 30. That is, in each of the tank compartment 40 and the fuel cell compartment 30, a fuel gas detector (the tank compartment internal gas detector 44*a*, the cell compartment internal gas detector 34*a*) that detects a fuel gas being a gaseous state of the fuel, is each installed.

In such a configuration, the control unit 12*a* controls the opening and closing the shutoff valves SV as described below based on a detection signal (detection result) output from the fuel gas detectors. Hereinafter, a specific example of control for the opening and closing the shutoff valves SV will be described with reference to FIGS. 1 and 2 as necessary based on the flowcharts starting in FIG. 3. Here, unless otherwise specified, it is presumed that the control unit 12*a* issues a closing command (a control signal for closing) to the release valve 72, whereby the release valve 72 is closed.

(3-1. Specific Example 1 of Control for Opening and Closing Shutoff Valve)

Figure 3:
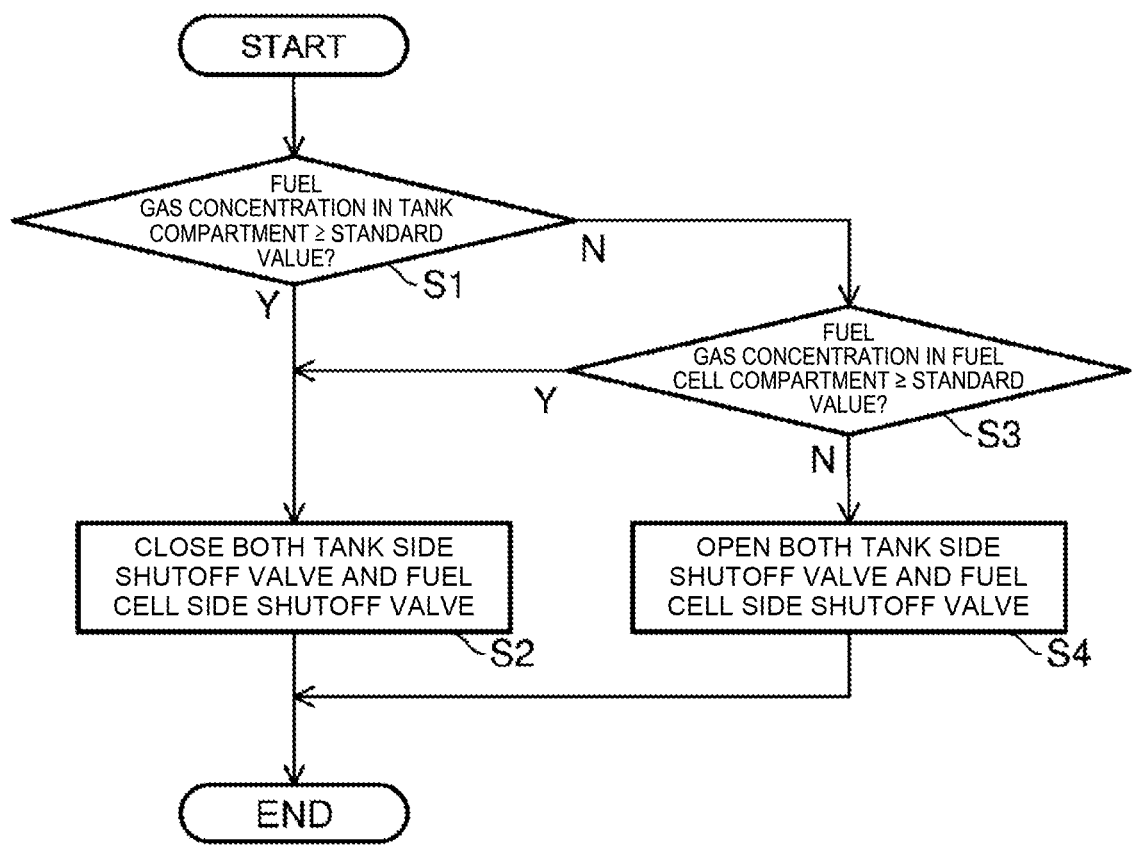
FIG. 3 is a flowchart illustrating a processing flow according to an example of control for opening and closing shutoff valves of the fuel cell ship.

FIG. 3 is a flowchart illustrating a processing flow according to an example of control for opening and closing the shutoff valves SV in the present embodiment. If the tank compartment internal gas detector 44*a* detects that the concentration of the fuel gas in the tank compartment 40 is equal to or greater than the standard value (Yes in S1), the control unit 12*a* outputs a closing signal to both the tank side shutoff valve 43 and the fuel cell side shutoff valve 33 to close both the tank side shutoff valve 43 and the fuel cell side shutoff valve 33 (S2). As a result, the supply of the fuel gas from the fuel tank 41 to the fuel cell 31 via the fuel gas supply pipe 32 is stopped.

For example, 40% LEL can be considered as the standard value, but as described above, the standard value may be appropriately determined based on experiments or experience (the same also applies to the standard values below).

In S1, even if the tank compartment internal gas detector 44*a* detects that the concentration of the fuel gas in the tank compartment 40 is less than the standard value (No in S1), when the cell compartment internal gas detector 34*a* detects that the concentration of the fuel gas in the fuel cell compartment 30 is equal to or greater than the standard value (Yes in S3), the control unit 12a outputs a closing signal to both the tank side shutoff valve 43 and the fuel cell side shutoff valve 33 to close both the tank side shutoff valve 43 and the fuel cell side shutoff valve 33 (S2). Therefore, in this case as well, the supply of the fuel gas from the fuel tank 41 to the fuel cell 31 via the fuel gas supply pipe 32 is stopped.

On the other hand, in S3 when the cell compartment internal gas detector 34a detects that the concentration of the fuel gas in the fuel cell compartment 30 is less than the standard value (No in S13), the control unit 12a outputs an opening signal to both the tank side shutoff valve 43 and the fuel cell side shutoff valve 33 to open both the tank side shutoff valve 43 and the fuel cell side shutoff valve 33 (S4). In this case, the fuel gas is supplied from the fuel tank 41 to the fuel cell 31 via the fuel gas supply pipe 32. The order of S1 and S3 may be interchanged.

(3-2. Specific Example 2 of Control for Opening and Closing Shutoff Valve)

Figure 4:
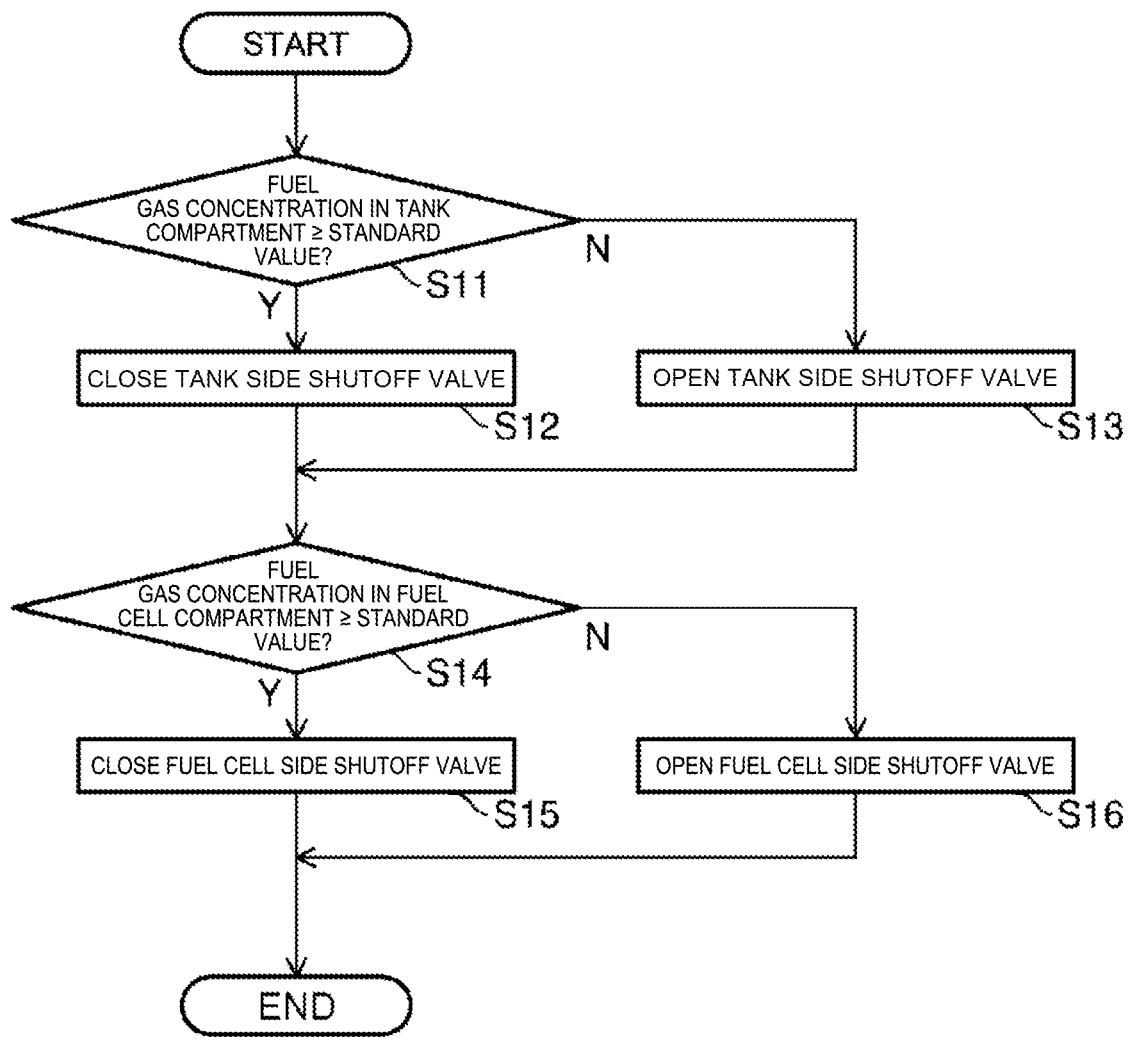
FIG. 4 is a flowchart illustrating a processing flow according to another example of control for opening and closing the shutoff valves.

FIG. 4 is a flowchart illustrating a processing flow according to another example of control for opening and closing the shutoff valves SV. The control unit 12a may control the opening and closing the shutoff valves SV as described below. That is, if the tank compartment internal gas detector 44a detects that the concentration of the fuel gas in the tank compartment 40 is equal to or greater than the standard value (Yes in S11), the control unit 12a outputs a closing signal to the tank side shutoff valve 43 to close the tank side shutoff valve 43 (S12). Due to the closing of the tank side shutoff valve 43, the supply of the fuel gas from the fuel tank 41 to the fuel cell 31 is stopped.

In S11, if the tank compartment internal gas detector 44a detects that the concentration of the fuel gas in the tank compartment 40 is less than the standard value (No in S11), the control unit 12a outputs an opening signal to the tank side shutoff valve 43 to open the tank side shutoff valve 43 (S13).

If the cell compartment internal gas detector 34a detects that the concentration of the fuel gas in the fuel cell compartment 30 is equal to or greater than the standard value (Yes in S14), the control unit 12a outputs a closing signal to the fuel cell side shutoff valve 33 to close the fuel cell side shutoff valve 33 (S15). As a result, even in a state in which the tank side shutoff valve 43 is open, the fuel gas supply from the fuel tank 41 to the fuel cell 31 is stopped due to the closing of the fuel cell side shutoff valve 33.

In S14, if the cell compartment internal gas detector 34a detects that the concentration of the fuel gas in the fuel cell compartment 30 is less than the standard value (No in S14), the control unit 12a outputs an opening signal to the fuel cell side shutoff valve 33 to open the fuel cell side shutoff valve 33 (S16). Therefore, if the tank side shutoff valve 43 is opened in S13, the fuel gas is supplied from the fuel tank 41 to the fuel cell 31 by opening the fuel cell side shutoff valve 33 in S16.

As described above, in the Specific Examples 1 and 2, if the concentration of the fuel gas is less than the standard value in both the tank compartment 40 and the fuel cell compartment 30, the fuel gas is supplied from the fuel tank 41 to the fuel cell 31 via the fuel gas supply pipe 32. If the concentration of the fuel gas is equal to or greater than the standard value in at least one of the tank compartment 40 and the fuel cell compartment 30, the fuel gas supply from the fuel tank 41 to the fuel cell 31 via the fuel gas supply pipe 32 is stopped.

Based on Specific Examples 1 and 2, the following can also be said. That is, if the tank compartment internal gas detector 44a detects that the concentration of the fuel gas is equal to or greater than the standard value, the control unit 12a closes the shutoff valve SV (tank side shutoff valve 43) in the compartment (tank compartment 40) in which the tank compartment internal gas detector 44a is installed. if the cell compartment internal gas detector 34a detects that the concentration of the fuel gas is equal to or greater than the standard value, the control unit 12a closes the shutoff valve SV (fuel cell side shutoff valve 33) in the compartment (fuel cell compartment 30) in which the cell compartment internal gas detector 34a is installed (see S2, S12, S15).

As described above, the fuel cell ship SH according to the present embodiment includes the control unit 12a that controls the opening and closing the shutoff valves SV. If at least one of the fuel gas detectors (at least one of the tank compartment internal gas detector 44a and the cell compartment internal gas detector 34a) (installed in the tank compartment 40 and the fuel cell compartment 30) detects that the concentration of the fuel gas is equal to or greater than a predetermined standard value, the control unit 12a closes the shutoff valve SV in the tank compartment 40 or the fuel cell compartment 30 in which the fuel gas detector that detects the concentration equal to or greater than the standard value is installed.

If the shutoff valve SV in the compartment where the fuel gas detector (the tank compartment internal gas detector 44a or the cell compartment internal gas detector 34a) that detects that the concentration of the fuel gas is equal to or greater than the standard value is installed is closed, and the supply of the fuel gas from the fuel tank 41 to the fuel cell 31 is stopped, the fuel cell 31 cannot generate electric power by an electrochemical reaction with the fuel gas. That is, in the unlikely event of a fuel gas leak in the above compartment so that the concentration is equal to or greater than the standard value, the electric power generation of the fuel cell 31 can be stopped. Even if the electric power generation of the fuel cell 31 is stopped, it is possible to continue the propulsion of the fuel cell ship SH by the propulsion device 6 by supplying electric power from the storage battery of the storage battery system 5.

Particularly, when at least one of the fuel gas detectors (at least one of the tank compartment internal gas detector 44a and the cell compartment internal gas detector 34a) detects that the concentration of the fuel gas is equal to or greater than the standard value, the control unit 12a closes the shutoff valves SV (the tank side shutoff valve 43, the fuel cell side shutoff valve 33) in all the compartments (S2).

If the concentration of the fuel gas is equal to or greater than the standard value, the shutoff valves SVs are closed in all the compartments: the tank compartment 40 and the fuel cell compartment 30. As a result, the supply of the fuel gas from the fuel tank 41 to the fuel cells 31 is reliably stopped, and the electric power generation of the fuel cells 31 can be reliably stopped.

[4. Combined Use with Control for Opening and Closing Release Valve]

Figure 5:
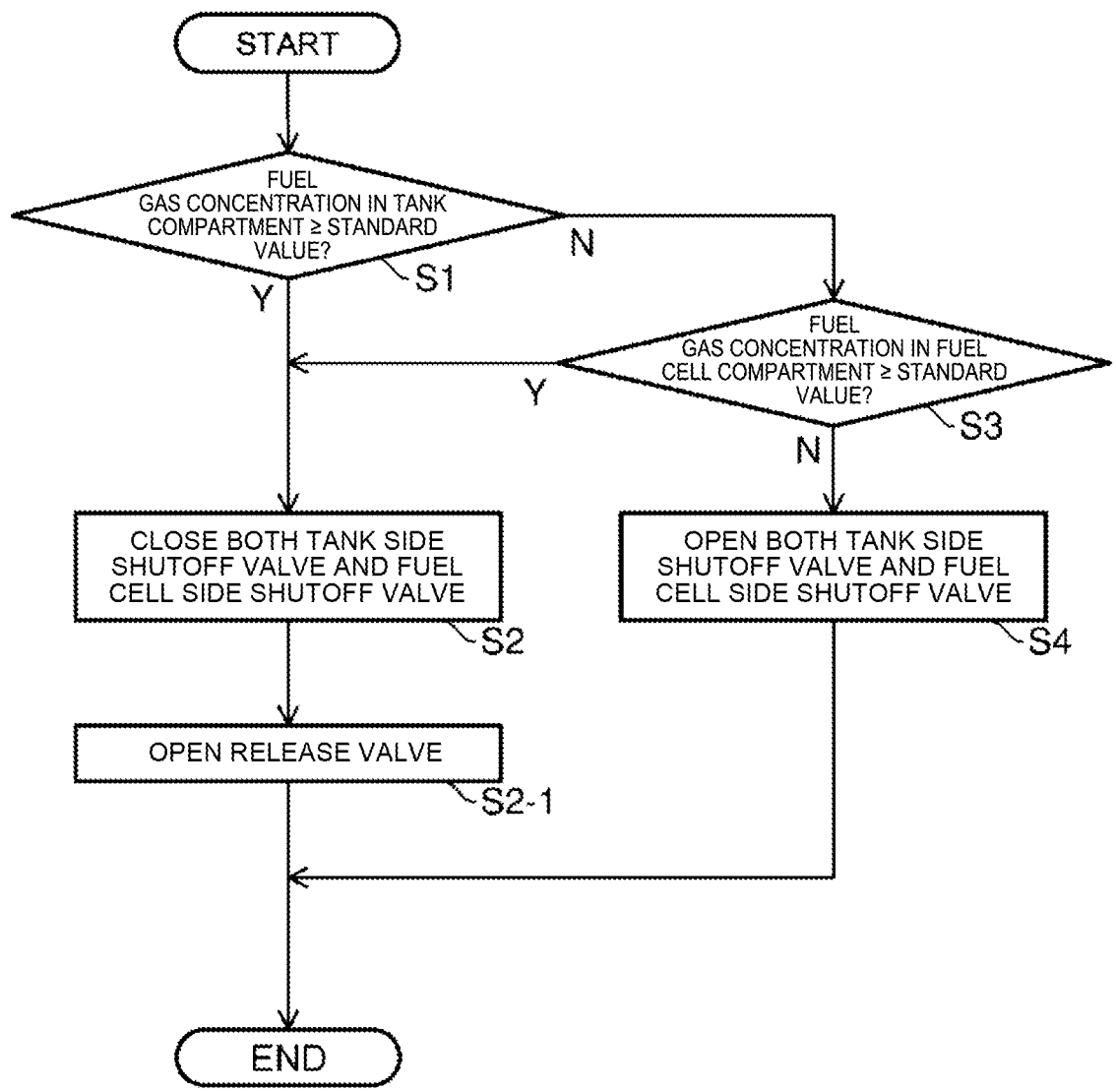
FIG. 5 is a flowchart illustrating a processing flow when control for opening and closing a release valve of the fuel cell ship is further performed.

FIG. 5 is a flowchart illustrating a processing flow when control for the opening and closing the release valve 72 is also controlled in control for the opening and closing the shutoff valves SV in the above-described Specific Example 1. The flowchart in FIG. 5 is similar to that in FIG. 3 except that step S2-1 is added. When at least one of the fuel gas detectors (at least one of the tank compartment internal gas detector 44a and the cell compartment internal gas detector 34a) detects that the concentration of the fuel gas is equal to or greater than the standard value (Yes in S1, or Yes in S3), it is desirable that the control unit 12a closes the tank side shutoff valve 43 and the fuel cell side shutoff valve 33 (S2) and opens the release valve 72 (S2-1).

In S2, when the tank side shutoff valve 43 and the fuel cell side shutoff valve 33 are closed, the fuel gas remains in the fuel gas supply pipe 32 between the tank side shutoff valve 43 and the fuel cell side shutoff valve 33. When the fuel gas with a high pressure is left remaining in the fuel gas supply pipe 32, there is a risk of explosion due to ignition when the fuel gas leaks for some reason.

In S2-1, if the control unit 12a controls to open the release valve 72, the fuel gas remaining in the fuel gas supply pipe 32 between the tank side shutoff valve 43 and the fuel cell side shutoff valve 33 may be released to the outside (for example, outside the ship) via the release valve 72. As a result, it is possible to avoid a situation in which the fuel gas with a high pressure is left remaining in the fuel gas supply pipe 32.

Figure 6:
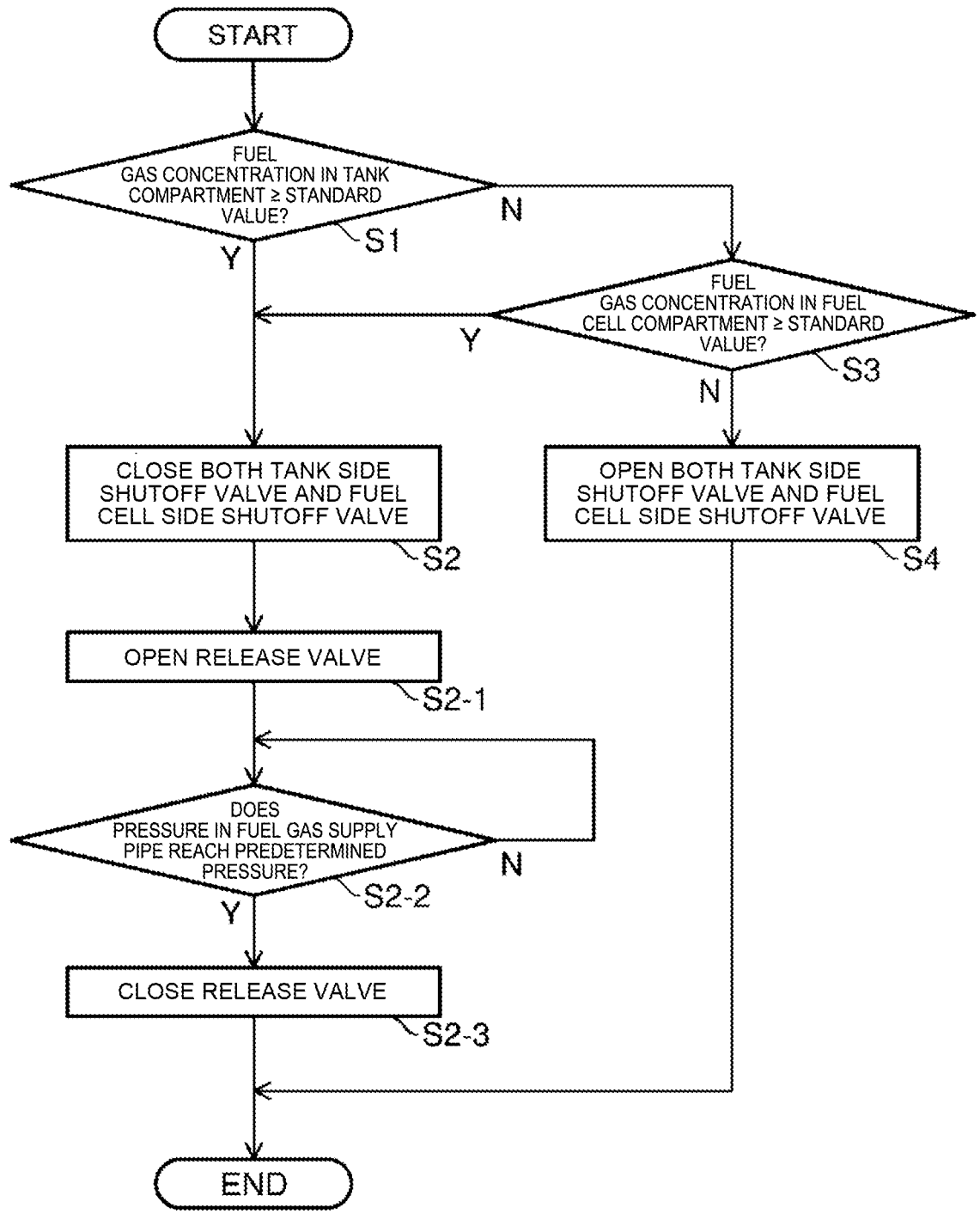
FIG. 6 is a flowchart illustrating a processing flow according to another example of control for opening and closing the release valve.

FIG. 6 is a flowchart illustrating a processing flow according to another example of control for opening and closing the release valve 72. The flowchart in FIG. 6 is similar to that in FIG. 5 except that steps S2-2 and S2-3 are added. When the pressure inside the fuel gas supply pipe 32 reaches a predetermined specified pressure after the release valve 72 is opened in S2-1, the control unit 12a desirably closes the release valve 72 (S2-2, S2-3).

The above-mentioned specified pressure refers to, for example, atmospheric pressure. Determining whether the pressure inside the fuel gas supply pipe 32 has reached the specified pressure may be performed by the control unit 12a determining whether a specified time (for example, one second) has elapsed since the release valve 72 was opened. The pressure inside the fuel gas supply pipe 32 may be measured by a pressure gauge, and based on the measurement result, the control unit 12a may determine whether the pressure inside the fuel gas supply pipe 32 has reached a specified pressure.

When the release valve 72 is left open for a long time in the state of atmospheric pressure, air enters the fuel gas supply pipe 32 from the outside (for example, via the vent pipe 10). In this case, when the release valve 72 is closed, the shutoff valve SV is opened, and the fuel gas is supplied from the fuel tank 41 to the fuel cell 31, to restart the fuel cell ship SH, the air existing in the fuel gas supply pipe 32 is also supplied to the fuel cell 31. The air may cause inconveniences such as oxidizing and corroding the electrodes of the fuel cell 31.

If the release valve 72 is closed after the release valve 72 is opened and then a pressure inside the fuel gas supply pipe 32 reaches a specified pressure, it then is possible to prevent air from entering the fuel gas supply pipe 32 from the outside (via the vent pipe 10) via the release valve 72. As a result, it is possible to reduce the possibility that the air will cause inconveniences such as corrosion of the electrodes of the fuel cell 31.

Figure 7:
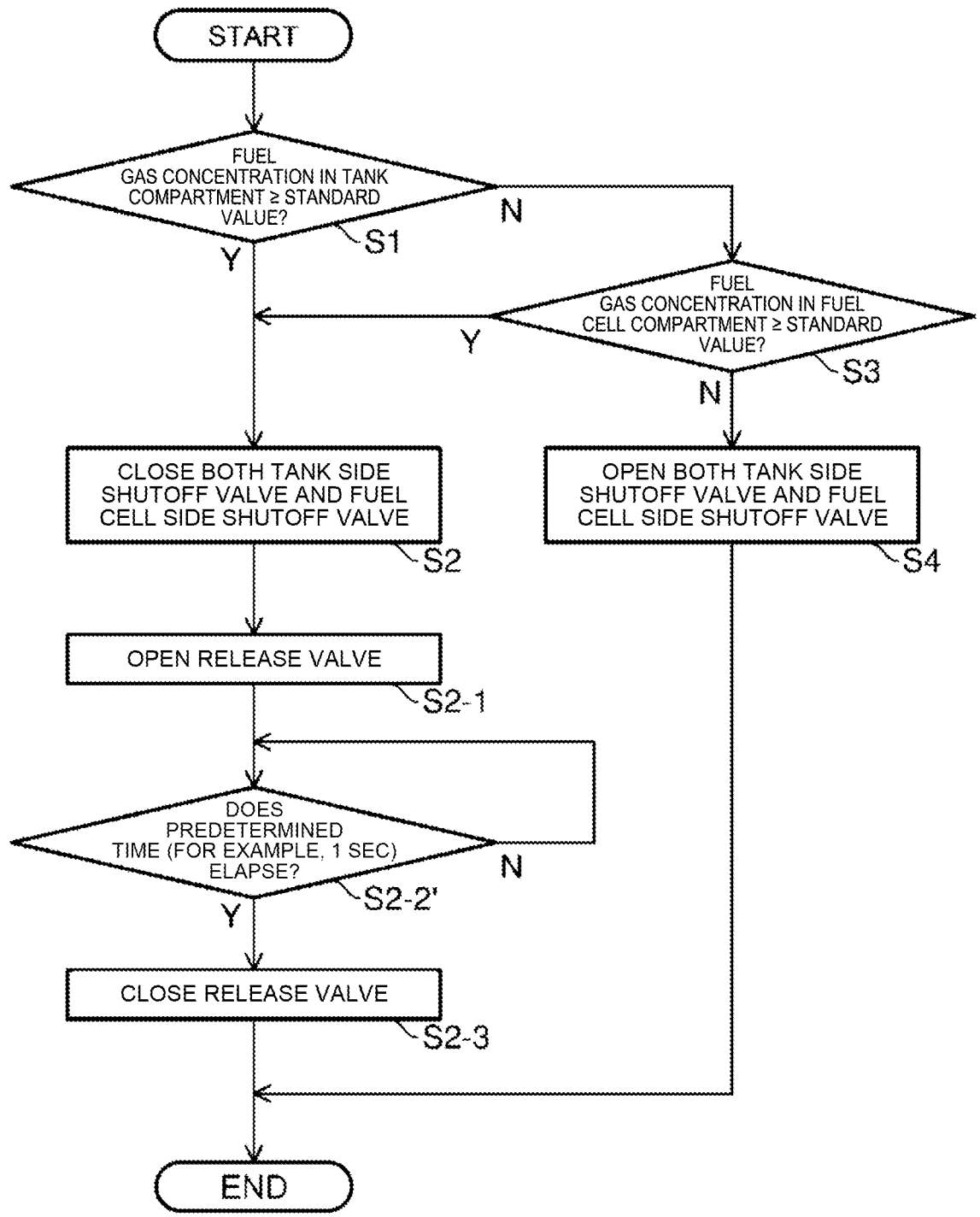
FIG. 7 is a flowchart illustrating a processing flow according to yet another example of control for opening and closing the release valve.

FIG. 7 is a flowchart illustrating a processing flow according to yet another example of control for opening and closing the release valve 72. The flowchart in FIG. 7 is similar to that in FIG. 6 except that step S2-2 is replaced with step S2-2'. The control unit 12a may close the release valve 72 after a predetermined specified time has elapsed since opening the release valve 72 in S2-1 (S2-2', S2-3). Desirably the specified time is set to a time shorter than the time when the pressure in the fuel gas supply pipe 32 reaches the atmospheric pressure after the release valve 72 is opened. From this aspect, the specified time may be set to several seconds (for example, one second).

If air (including oxygen) exists in the fuel gas supply pipe 32, then, when the release valve 72 is closed, the shutoff valves SV are opened, and a fuel gas is supplied from the fuel tank 41 to the fuel cell 31 to restart an operation of the fuel cell ship SH, the above air may be also supplied to the fuel cell 31, and inconveniences such as corrosion of the electrodes of the fuel cell 31 may occur as described above.

If the release valve 72 is closed after a predetermined specified time has elapsed since the release valve 72 was opened, the amount of air entering the fuel gas supply pipe 32 from the outside via the release valve 72 can be reduced as much as possible. As a result, it is possible to reduce as much as possible the possibility of causing inconveniences such as corrosion of the electrodes of the fuel cell 31 described above.

[5. Control for Opening and Closing Shutoff Valves and Release Valve in Consideration of the Duct Compartment]

Figure 8:
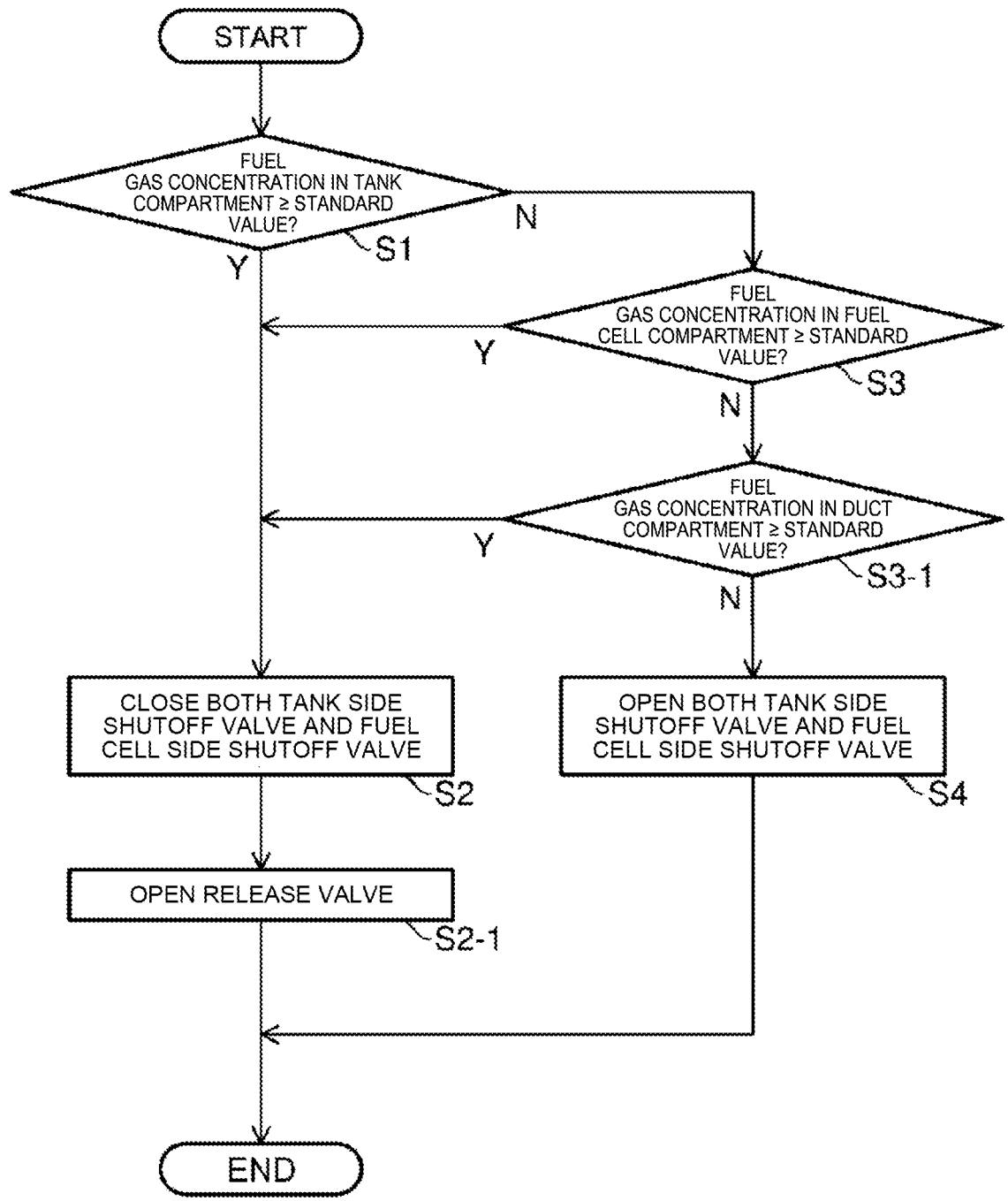
FIG. 8 is a flowchart illustrating a processing flow according to an example of control for opening and closing the shutoff valves and the release valve in consideration of also detecting a fuel gas in a duct compartment of the fuel cell ship.

FIG. 8 is a flowchart illustrating a processing flow according to an example of control for opening and closing the shutoff valves SV and the release valve 72 in consideration of also detecting a fuel gas in the duct compartment. The flowchart in FIG. 8 is similar to that in FIG. 5 except that step S3-1 is added between steps S3 and S4. FIG. 8 does not illustrate steps (S2-2, S2-2', S2-3) of closing the release valve 72 after opening the release valve 72 as illustrated in FIGS. 6 and 7, but needless to say, these steps may also be performed.

In the present embodiment, as described above, a fuel gas detector is installed in the duct compartment 90 in addition to the tank compartment 40 and the fuel cell compartment 30. For example, an upper duct compartment internal gas detector 88 is installed in the upper duct compartment 80. In this configuration, when the fuel gas detector in the duct compartment 90 (for example, the upper duct compartment internal gas detector 88) detects that the concentration of the fuel gas is equal to or greater than the standard value, the control unit 12a may close the tank side shutoff valve 43 and the fuel cell side shutoff valve 33 (S3-1, S2). When the fuel gas detector in the lower duct compartment 70 (the lower duct compartment internal gas detector 73) detects that the concentration of the fuel gas is equal to or greater than the standard value, the control unit 12a may close the tank side shutoff valve 43 and fuel cell side shutoff valve 33.

In the duct compartment 90, even if a fuel gas leak occurs so that the concentration of the fuel gas is equal to or greater than the standard value, the tank side shutoff valve 43 and the fuel cell side shutoff valve 33 are closed. As a result, the supply of the fuel gas from the fuel tank 41 to the fuel cell 31 is stopped. Therefore, even if a fuel gas leak occurs in the duct compartment 90, the electric power generation of the fuel cell 31 can be stopped.

[6. Failure Determination of Release Valve]

In the present embodiment, as described above, the fuel gas discharge pipe 71 branching from the fuel gas supply pipe 32 extends from the inside the lower duct compartment 70 to the inside of the upper duct compartment 80 and further communicates with the inside of the vent pipe 10. In this configuration, it is possible to guide the fuel gas discharged from the fuel gas discharge pipe 71 via the release valve 72 to the vent pipe 10 and then discharge the fuel gas to the outside via the vent pipe 10. The vent pipe internal gas detector 10a is provided inside the vent pipe 10.

Thus, in the configuration in which the fuel cell ship SH is provided with the vent pipe 10 that guides the fuel gas discharged from the fuel gas discharge pipe 71 to the outside through the release valve 72, and the vent pipe internal gas detector 10*a* that detects the fuel gas inside the vent pipe 10, the control unit 12*a* can determine whether the release valve 72 has failed by using the detection result of the vent pipe internal gas detector 10*a*. This will be described in detail below.

Figure 9:
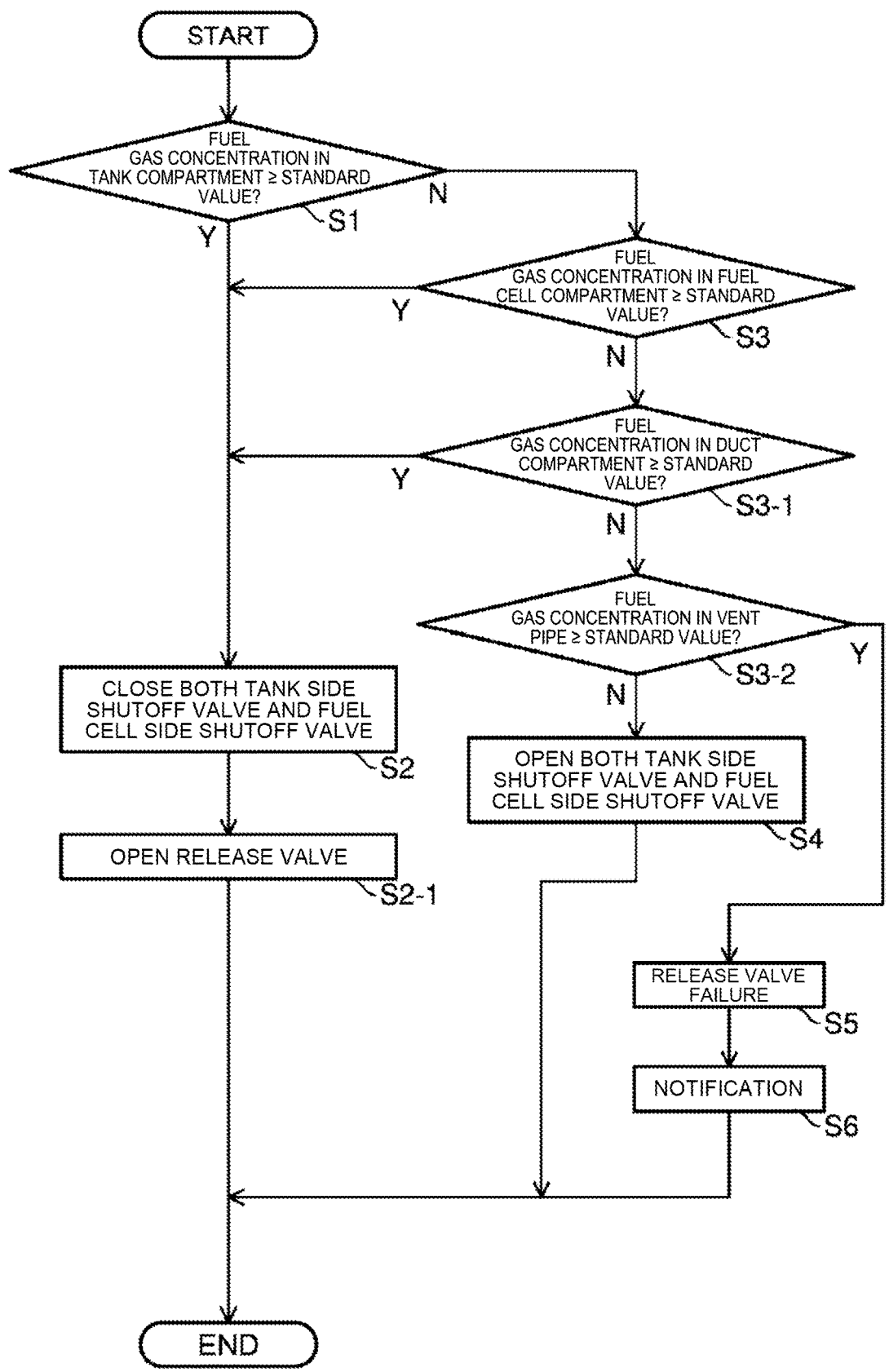
FIG. 9 is a flowchart illustrating a processing flow according to an example of control for opening and closing the shutoff valves and the release valve in consideration of also detecting a fuel gas by a vent pipe internal gas detector of the fuel cell ship.

FIG. 9 is a flowchart illustrating a processing flow according to an example of control for opening and closing the shutoff valves SV and the release valve 72 in consideration of also detecting the fuel gas by the vent pipe internal gas detector 10*a*. The flowchart of FIG. 9 is similar to that of FIG. 8 except that steps S3-2, S5, and S6 are added. The control unit 12*a* is in a state of issuing a closing command to the release valve 72.

When, in S1, the tank compartment internal gas detector 44*a* detects that the concentration of the fuel gas in the tank compartment 40 is less than the standard value (No in S1), in S3, the cell compartment internal gas detector 34*a* detects that the concentration of the fuel gas in the fuel cell compartment 30 is less than the standard value (No in S3), in S3-1, the upper duct compartment internal gas detector 88 detects that the concentration of the fuel gas in the duct section 90 is less than the standard value (No in S3-1), if the vent pipe internal gas detector 10*a* detects that the fuel gas inside the vent pipe 10 is equal to or greater than the standard value (No in S3-2), the control unit 12*a* determines that the release valve 72 has failed (S5). The reason why the control unit 12*a* makes such a determination is as described below.

The fuel gas detected by the vent pipe internal gas detector 10*a* is one of: (A) a fuel gas that has leaked inside the tank compartment 40 and flowed into the vent pipe 10, (B) a fuel gas that has leaked into the duct compartment 90 and flowed to the vent pipe 10 via the vent pipe communication portion 81, (C) a fuel gas that has leaked into the fuel cell compartment 30 and then flowed into the vent pipe 10 via the duct compartment 90 and the vent pipe communication portion 81, or (D) a fuel gas that has flowed to the vent pipe 10 through the fuel gas discharge pipe 71. Of these, the fuel gas (A) is always detected by the tank compartment internal gas detector 44*a*. The fuel gases (B) and (C) are always detected by the upper duct compartment internal gas detector 88. Therefore, even though the fuel gas is not detected by the tank compartment internal gas detector 44*a* and the upper duct compartment internal gas detector 88, the fact that the vent pipe internal gas detector 10*a* detects the fuel gas means that the fuel gas is not the fuel gases (A) to (C) but the fuel gas (D).

Here, for example, in a state in which the control unit 12*a* issues an opening command to the release valve 72 and the release valve 72 is opened, in the fuel gas discharge pipe 71, the fuel gas flows in the fuel gas discharge pipe 71 to the vent pipe 10 via the discharge valve 72. Therefore, it is natural that the vent pipe internal gas detector 10*a* detects the fuel gas. However, in a state in which the control unit 12*a* issues a closing command to the release valve 72, if the vent pipe internal gas detector 10*a* detects the fuel gas, the discharge valve 72 does not completely close the flow path of the fuel gas discharge pipe 71. Therefore, in the case of No in S3-2, the control unit 12*a* can determine that the release valve 72 has failed (S5).

In S5, if the control unit 12*a* determines that the release valve 72 has failed, the control unit 12*a* notifies the outside (S6). The above notification includes a monitor display, output of an alarm sound, transmission of information to an external terminal (for example, transmission of e-mail), and the like.

As described above, the control unit 12*a*, based on the detection results of the fuel gas detectors (for example, the tank compartment internal gas detector 44*a* and the upper duct compartment internal gas detector 88) and the vent pipe internal gas detector 10*a*, determines whether the release valve 72 has failed (S1, S3-1, S3-2), and if the release valve 72 has failed, notifies the outside (S5, S6).

By notifying the outside if the release valve 72 has failed, it is possible to quickly prompt a maintenance person to inspect, repair, or replace the release valve 72.

Particularly, when the vent pipe internal gas detector 10*a* detects a fuel gas having a concentration equal to or greater than the standard value in a state in which none of the fuel gas detectors in the tank compartment 40 and in the duct compartment 90 (for example, the tank compartment internal gas detector 44*a* and the upper duct compartment internal gas detector 88) has detected a fuel gas having a concentration equal to or greater than the standard value, and a closing command has been issued to the release valve 72, the control unit 12 determines that the release valve 72 has failed (S5).

When the vent pipe internal gas detector 10*a* detects a fuel gas having a concentration equal to or greater than the standard value even though a fuel gas leakage is not detected in the tank compartment 40 and in the duct compartment 90 and a command to close the release valve 72 has been issued, there is a high possibility that a fuel gas has leaked from the release valve 72 and flows into the vent pipe 10. Therefore, it is possible to reliably determine whether the release valve 72 has failed by the above determination method.

[7. Other]

In the present embodiment, a fuel gas being gaseous is used as fuel supplied from the fuel tank 41 to the fuel cell 31, but the fuel is not limited to a gas and may be a liquid. If a liquid fuel is used, when the liquid fuel leaks from a pipe, the leaked liquid fuel vaporizes and is a gas (fuel gas).

In the present embodiment, the configuration in which the fuel cell ship SH has the duct compartment 90 has been described, but the duct compartment 90 may not be installed. For example, if vent pipes corresponding to each of the tank compartment 40 and the fuel cell compartment 30 are provided, the installation of the duct compartment 90 may be omitted (this is because it is not necessary to maintain a flow path from the fuel cell compartment 30 to the vent pipe 10). In this case, for example, the control for opening and closing the shutoff valves SV and the release valve 72 illustrated in FIGS. 3 to 7 is effective.

However, in the configuration in which the fuel cell ship SH has the duct compartment 90 as in the present embodiment, the air inside each compartment (the tank compartment 40, the fuel cell compartment 30, the duct compartment 90) of the fuel cell ship SH or the fuel gas at the time of leakage can be collected in the vent pipe 10 communicating with the tank compartment 40 and the duct compartment 90 to be discharged to outside the ship. As a result, the fuel cell ship SH can be compactly configured because the number of parts is reduced compared to a configuration in which the vent pipe is separately provided in the fuel cell compartment 30 and dangerous places specified by ship safety regulations is reduced.

Embodiments of the present invention have been described above; however, the scope of the present invention is not limited to these embodiments, and can be extended or modified without departing from the gist of the invention.

INDUSTRIAL APPLICABILITY

The present invention can be used, for example, in a fuel cell ship.

REFERENCE SIGNS LIST

1 . . . Hull
6 . . . Propulsion device
10 . . . Vent pipe
10a . . . Vent pipe internal gas detector
12a . . . Control unit
30 . . . Fuel cell compartment
31 . . . Fuel cell
32 . . . Fuel gas supply pipe (fuel supply pipe)
33 . . . Fuel cell side shutoff valve
34a . . . Cell compartment internal gas detector (fuel gas detector)
40 . . . Tank compartment
41 . . . Fuel tank
43 . . . Tank side shutoff valve
44a . . . Tank compartment internal gas detector (fuel gas detector)
70 . . . Lower duct compartment (duct compartment)
71 . . . Fuel gas discharge pipe (fuel discharge pipe)
72 . . . Release valve
73 . . . Lower duct compartment internal gas detector (fuel gas detector)
80 . . . Upper duct compartment (duct compartment)
88 . . . Upper duct compartment internal gas detector (fuel gas detector)
90 . . . Duct compartment
SH . . . Fuel cell ship
SV . . . Shutoff valve

The invention claimed is:

1. A fuel cell ship comprising:
a fuel cell configured to generate electric power by an electrochemical reaction of fuel;
a propulsion device configured to generate a propulsive force in a hull by the electric power supplied from the fuel cell;
a fuel cell compartment in which the fuel cell is installed;
a tank compartment in which a fuel tank configured to store the fuel is installed; and
a fuel supply pipe through which the fuel is configured to be supplied from the fuel tank to the fuel cell,
wherein:
the fuel supply pipe includes two or more shutoff valves,
at least one of the two or more shutoff valves is installed in each of the tank compartment and the fuel cell compartment,
the fuel cell ship further includes a control unit configured to control opening and closing of the two or more shutoff valves,
the tank compartment and the fuel cell compartment are each provided with fuel gas detectors configured to detect a fuel gas being in a gaseous state of the fuel, and
based on detection by at least one of the fuel gas detectors that a concentration of the fuel gas is equal to or greater than a predetermined standard value, the control unit is configured to close the shutoff valve in a compartment out of the tank compartment and the fuel cell compartment, in which the fuel gas detector that detects that the concentration is equal to or greater than the predetermined standard value is installed.

2. The fuel cell ship according to claim 1, wherein the control unit is configured to close the shutoff valves in all of the compartments based on detection by at least one of the fuel gas detectors that the concentration of the fuel gas is equal to or greater than the predetermined standard value.

3. The fuel cell ship according to claim 2, wherein:
the shutoff valve installed in the tank compartment is a tank side shutoff valve and the shutoff valve installed in the fuel cell compartment is a fuel cell side shutoff valve,
the fuel cell ship further comprises:
a fuel discharge pipe branched from the fuel supply pipe and provided between the tank side shutoff valve and the fuel cell side shutoff valve; and
a release valve installed in the fuel discharge pipe, and
the control unit is configured to close the tank side shutoff valve and the fuel cell side shutoff valve and to open the release valve based on detection by at least one of the fuel gas detectors that the concentration of the fuel gas is equal to or greater than the predetermined standard value.

4. The fuel cell ship according to claim 3, wherein the control unit is configured to close the release valve based on a pressure in the fuel supply pipe being greater than or equal to a predetermined specified pressure after the release valve is opened.

5. The fuel cell ship according to claim 3, wherein the control unit is configured to close the release valve after a predetermined specified time elapses after the release valve is opened.

6. The fuel cell ship according claim 3, further comprising:
a duct compartment that houses a part of the fuel supply pipe,
wherein:
the fuel gas detector is further installed in the duct compartment in addition to the tank compartment and the fuel cell compartment, and
the control unit is configured to close the tank side shutoff valve and the fuel cell side shutoff valve based on detection by the fuel gas detector in the duct compartment that the concentration of the fuel gas is equal to or greater than the predetermined standard value.

7. The fuel cell ship according to claim 6 further comprising:
a vent pipe configured to guide, to outside, the fuel gas discharged from the fuel discharge pipe via the release valve; and
a vent pipe internal gas detector configured to detect the fuel gas inside the vent pipe,
wherein the control unit is configured to:
determine whether the release valve has failed based on detection results of the fuel gas detectors and the vent pipe internal gas detector, and
provide a notification.

8. The fuel cell ship according to claim 7, wherein the control unit is configured to:
based on detection by the vent pipe internal gas detector that the fuel gas has a concentration equal to or greater than the predetermined standard value in a state in which neither of the fuel gas detectors in the tank compartment and in the duct compartment detect the fuel gas having the concentration equal to or greater than the predetermined standard value:

determine that the release valve has failed, and issue a closing command to the release valve.

* * * * *